Dec. 4, 1945.   I. F. LAUCKS ET AL   2,390,159
HANDLING AND PRESSING MEANS AND METHOD
Filed May 27, 1940   18 Sheets-Sheet 3

Fig. 3.

Inventors
Irving F. Laucks, Ericsson H. Merritt,
Walter D. Lawshe & Theodore W. Dike
By Cushman Darby & Cushman
Attorneys

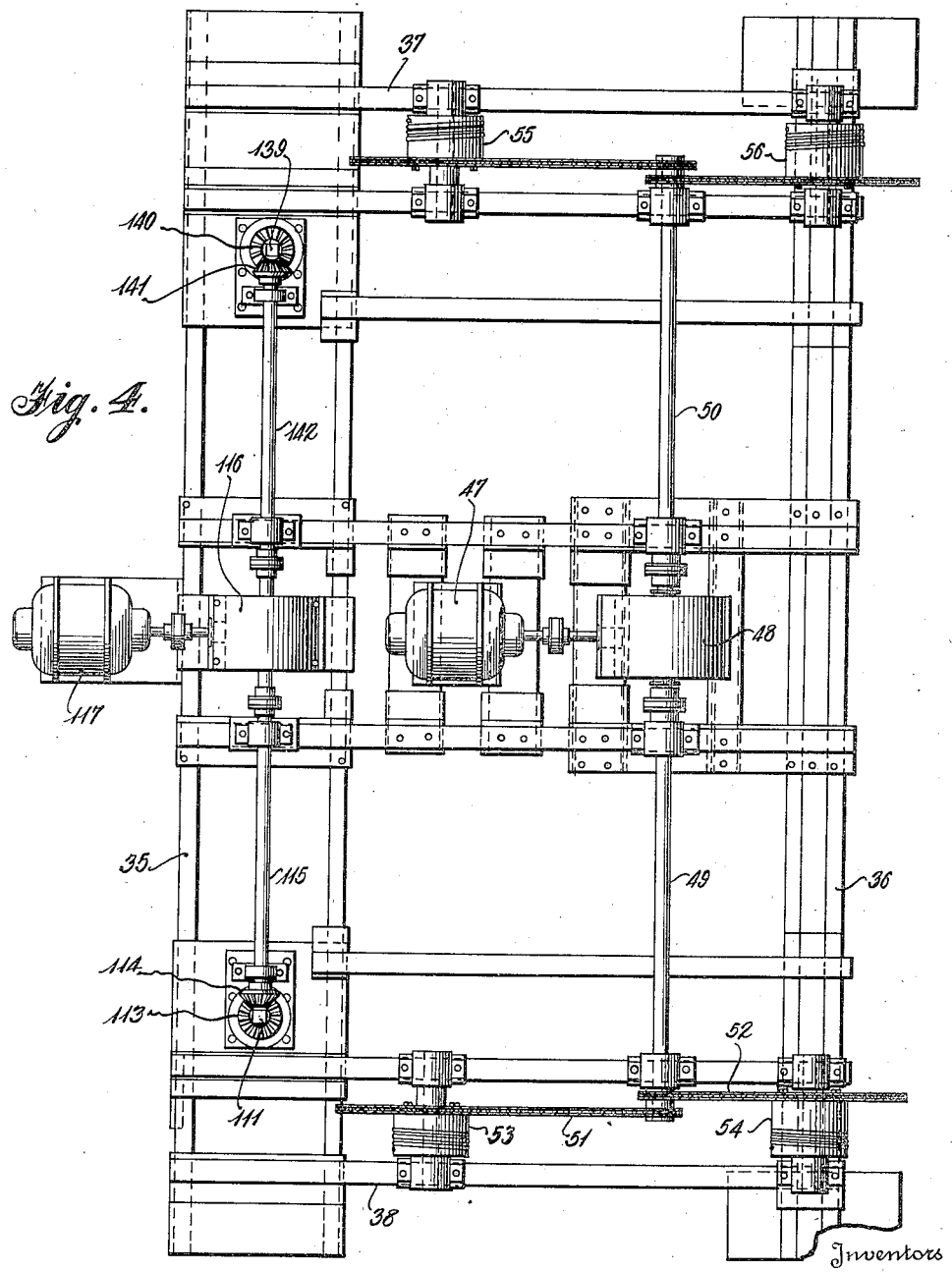

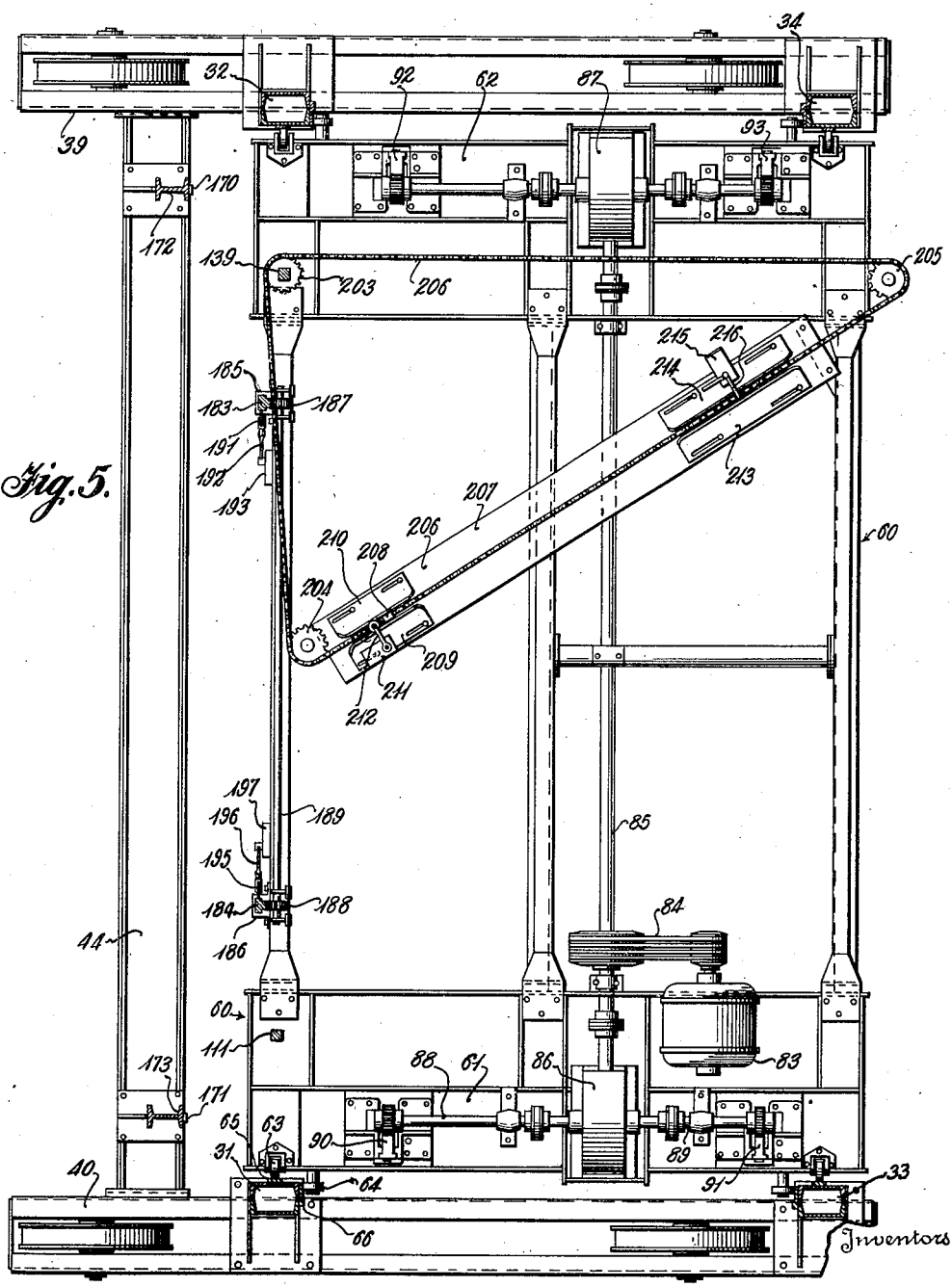

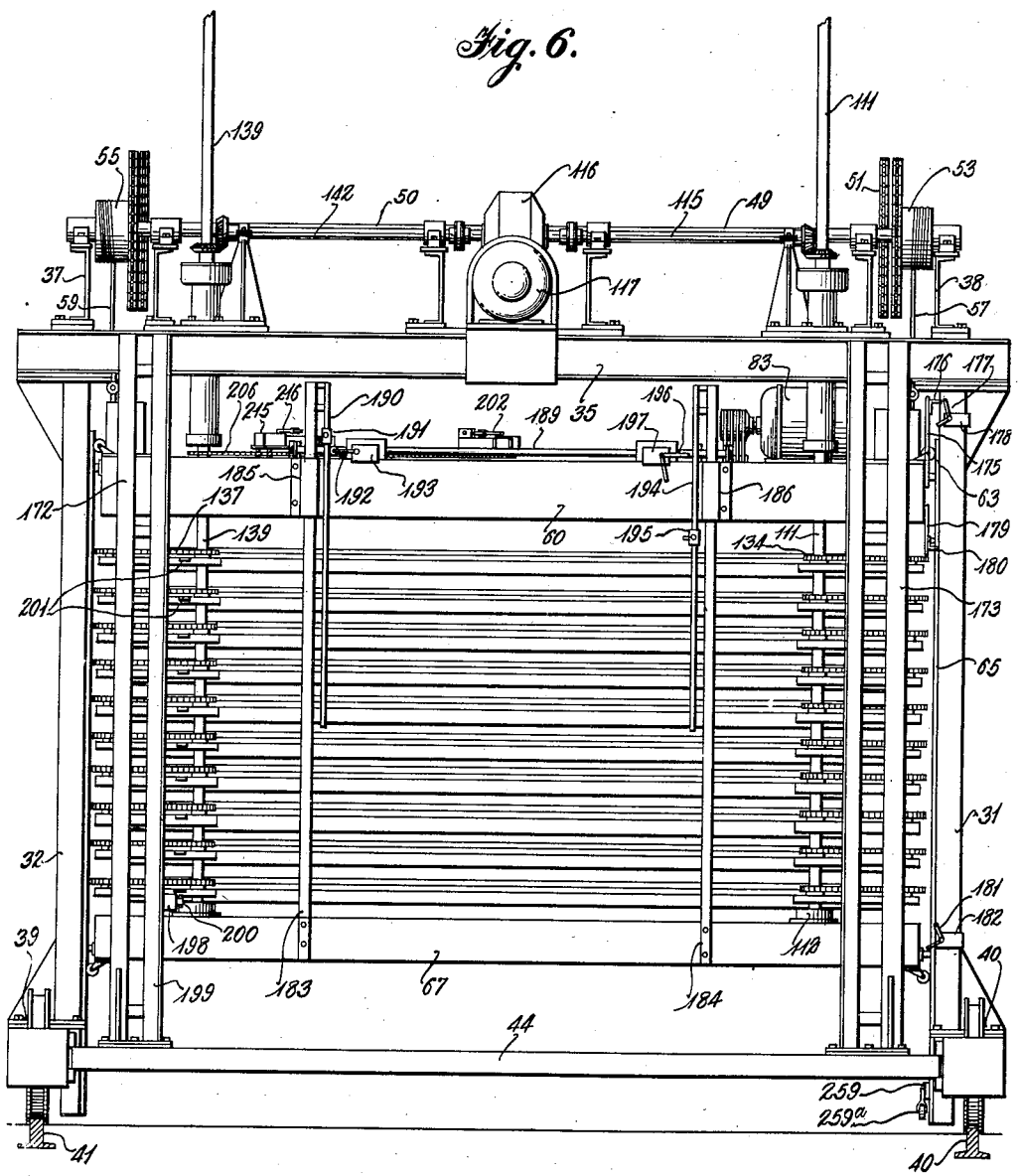

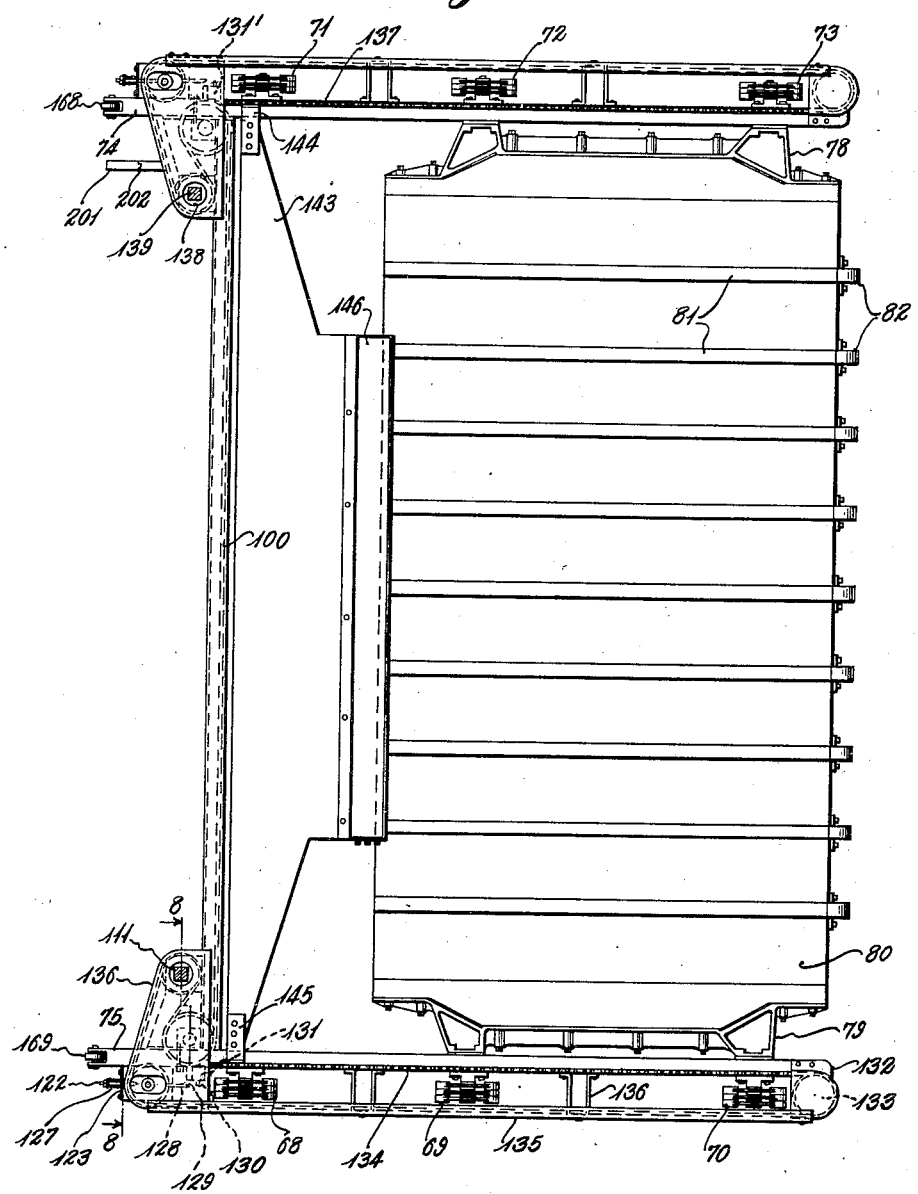

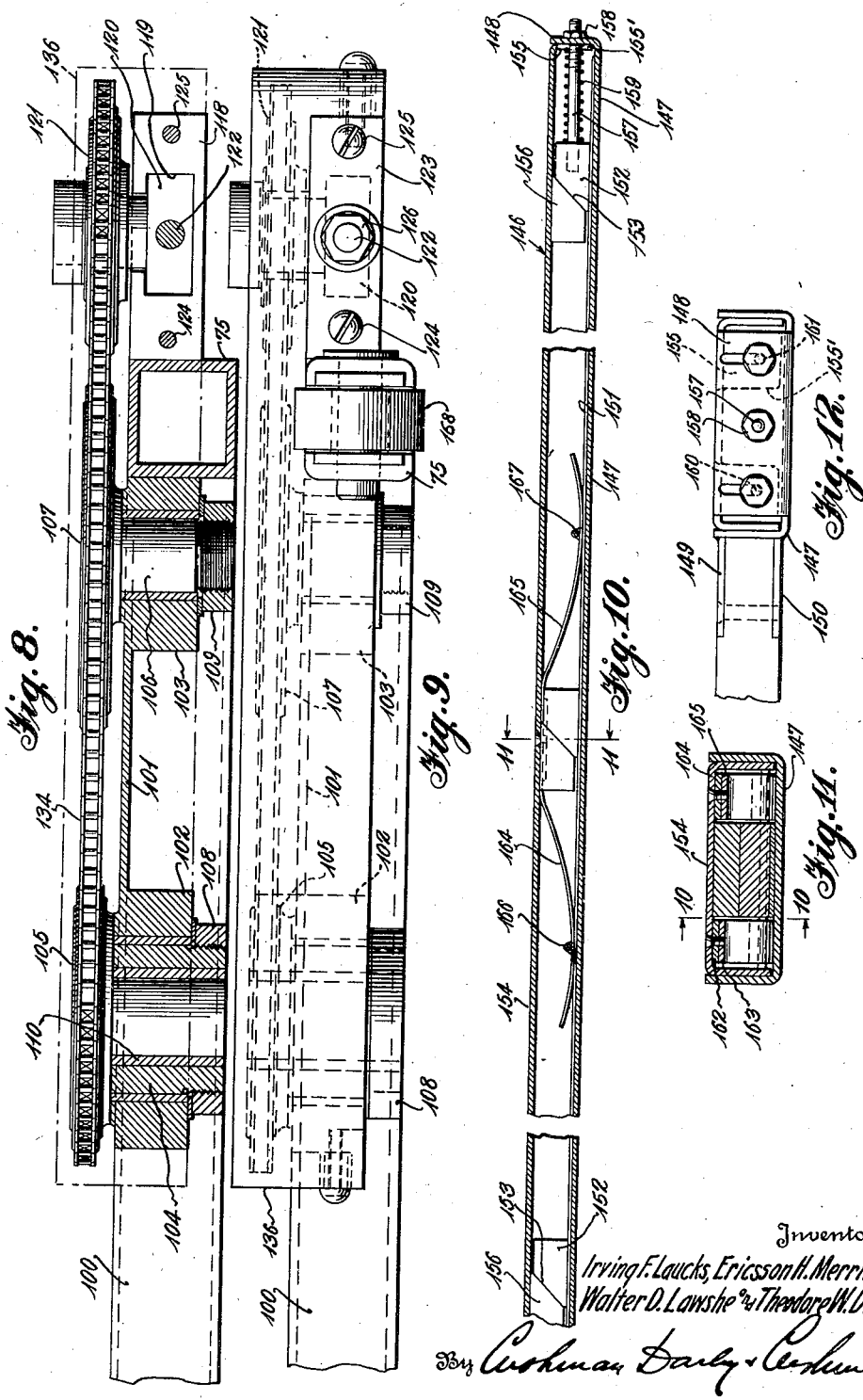

Dec. 4, 1945.  I. F. LAUCKS ET AL  2,390,159
HANDLING AND PRESSING MEANS AND METHOD
Filed May 27, 1940  18 Sheets-Sheet 9

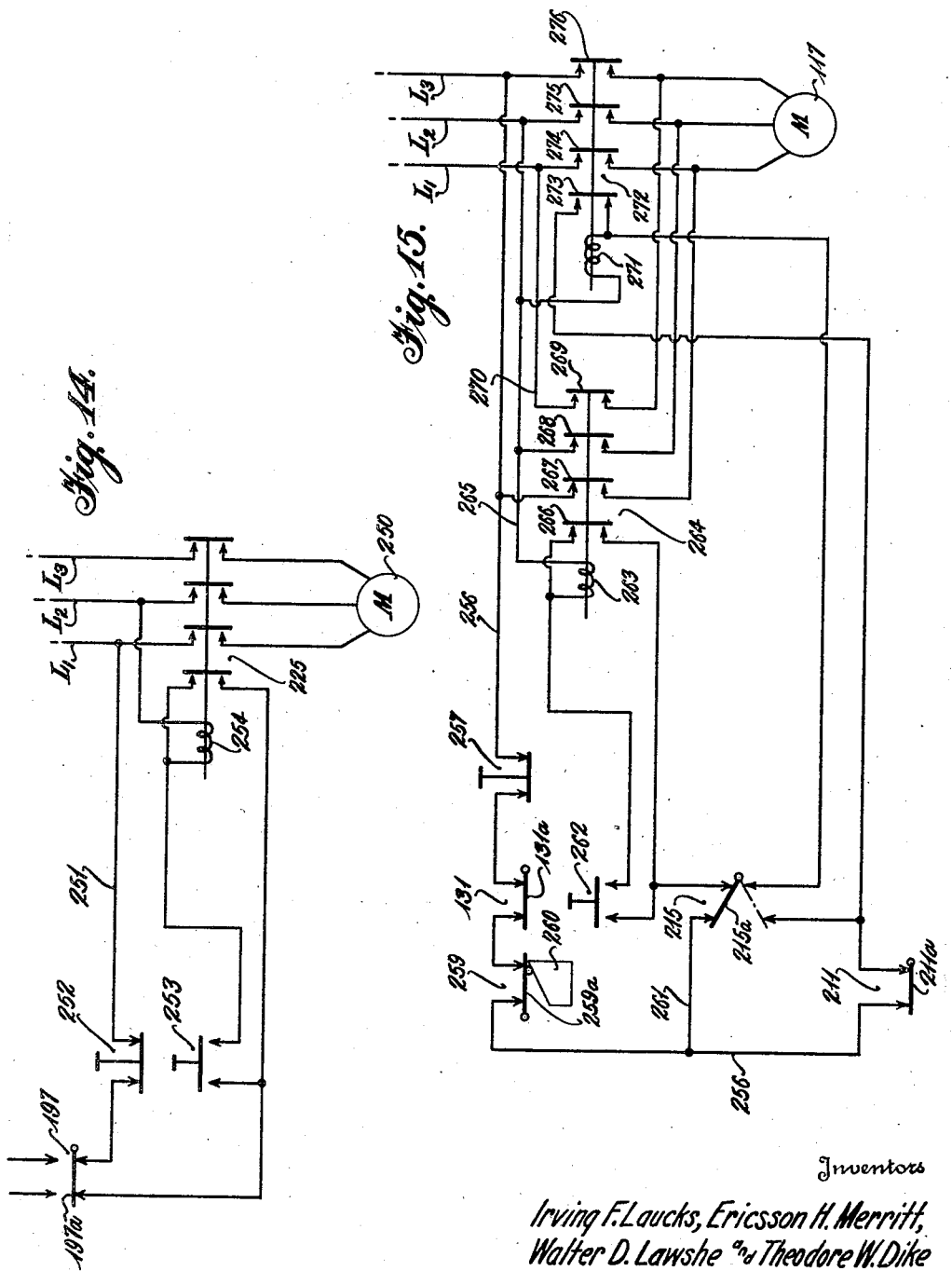

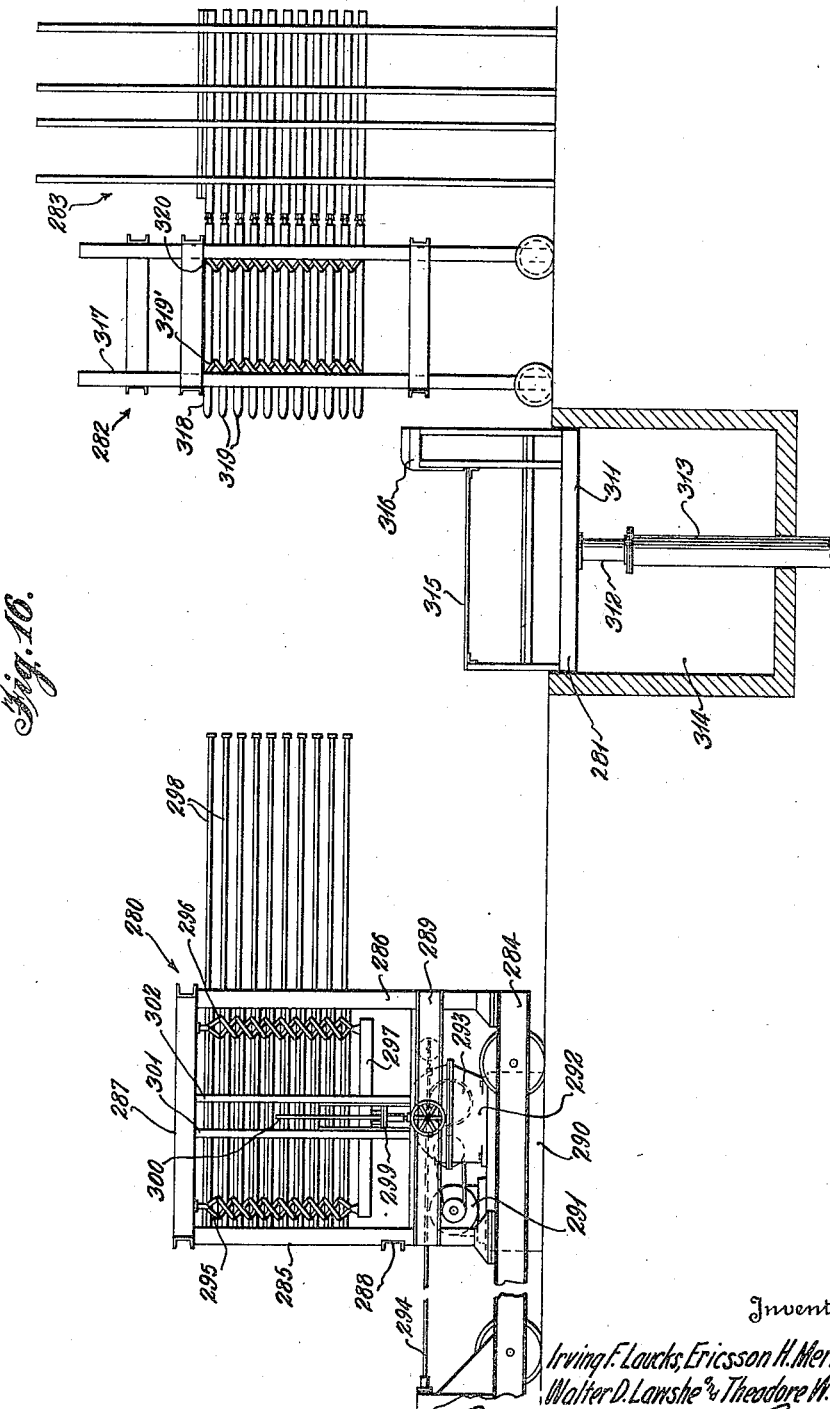

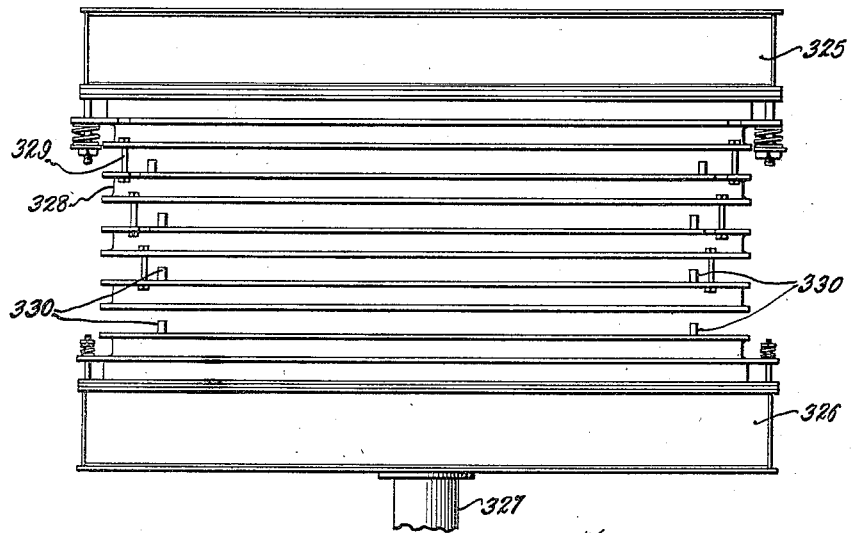
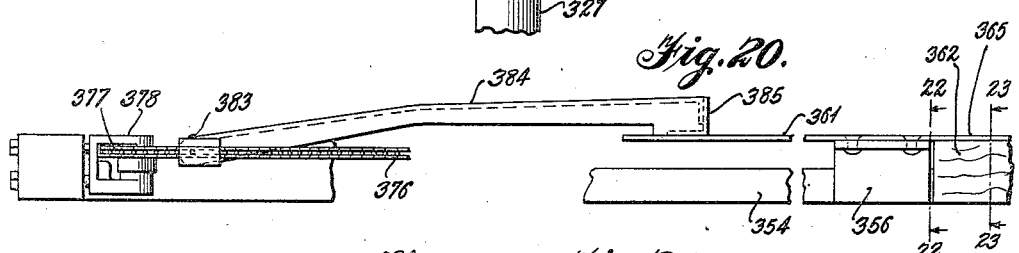
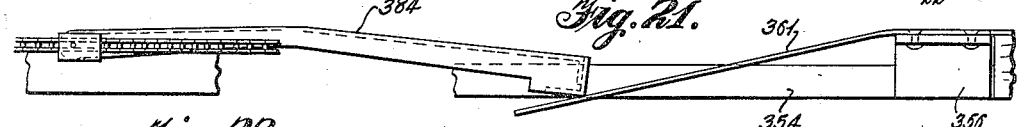
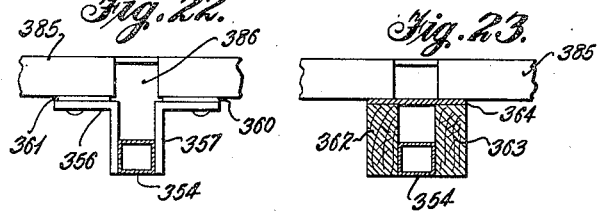
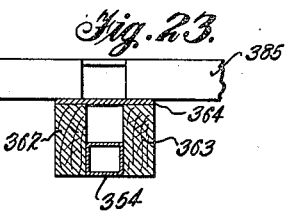
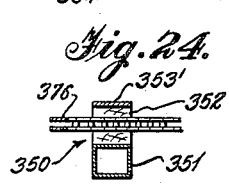
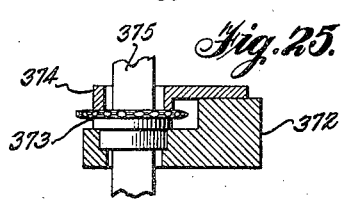

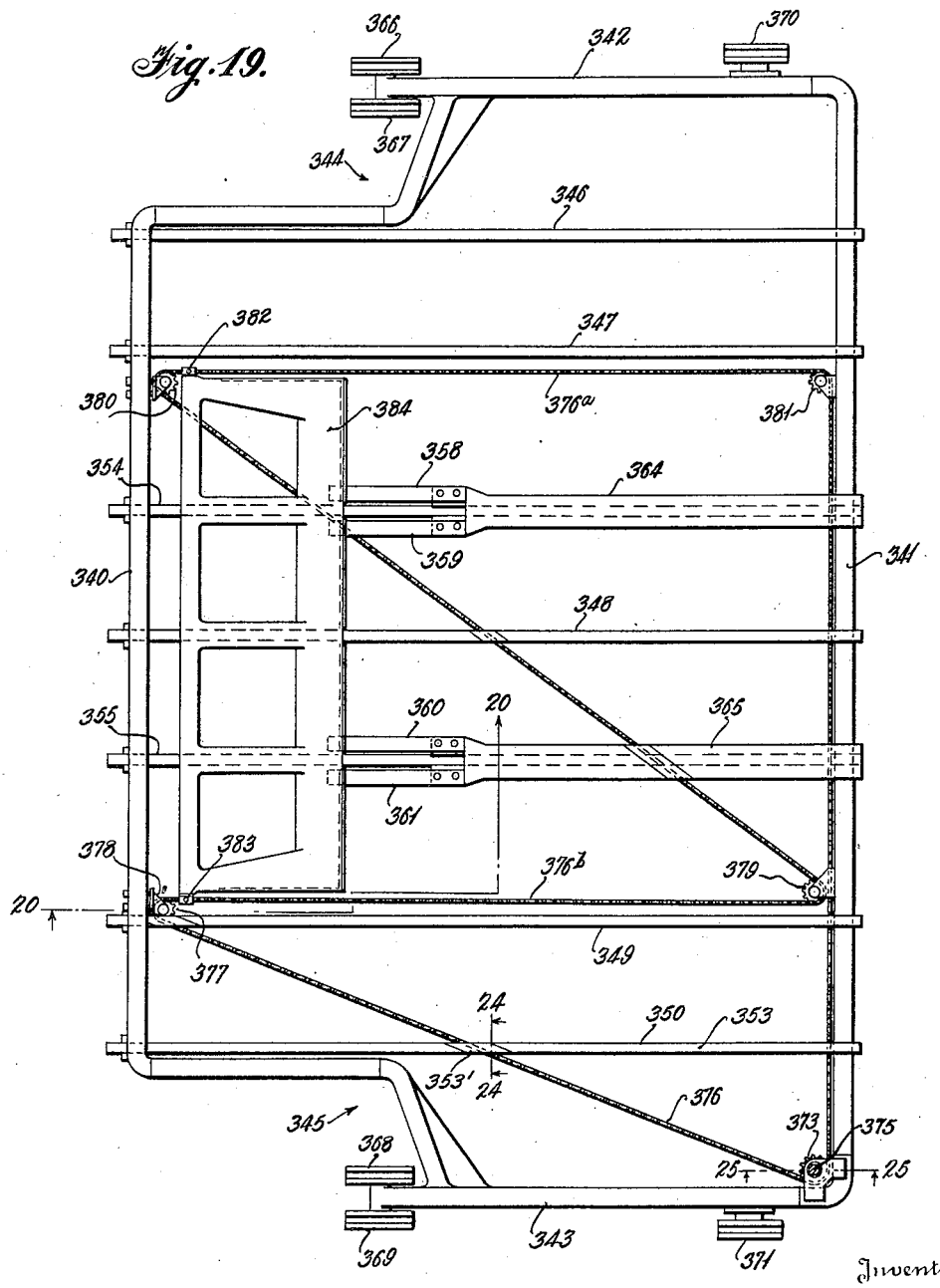

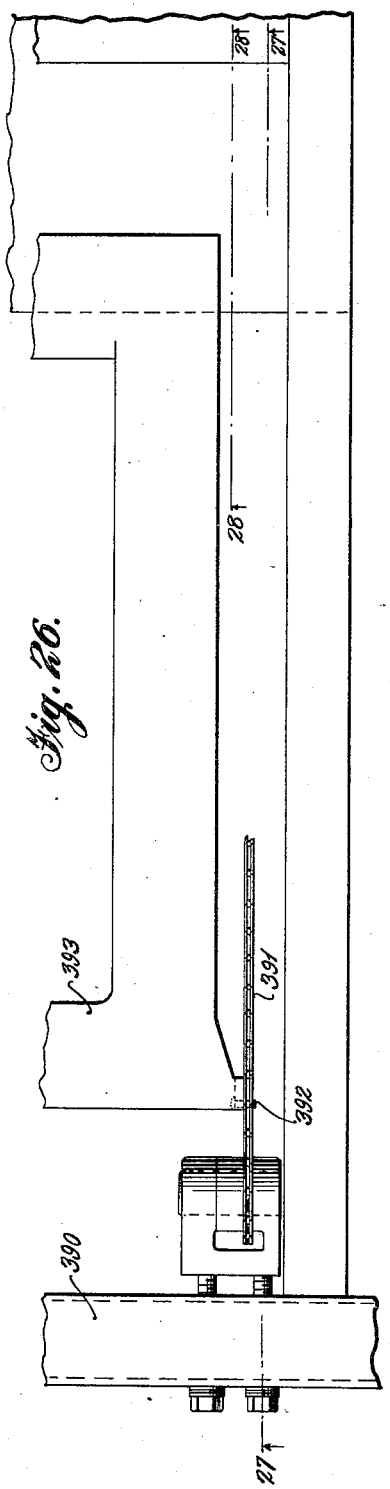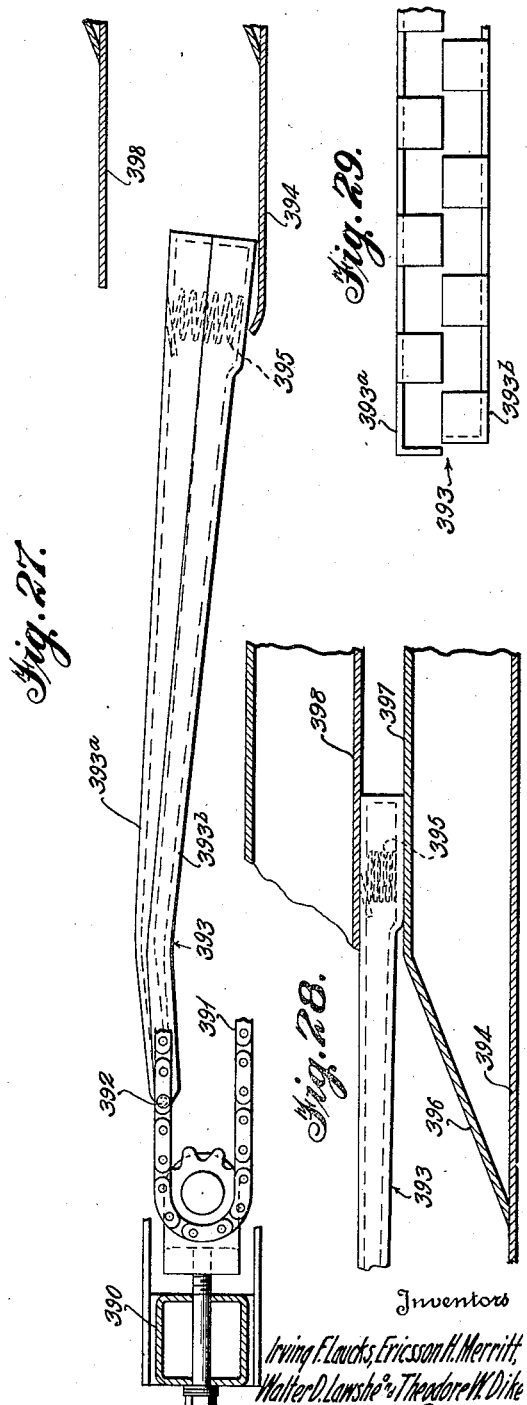

Dec. 4, 1945.　　　　I. F. LAUCKS ET AL　　　　2,390,159
HANDLING AND PRESSING MEANS AND METHOD
Filed May 27, 1940　　　18 Sheets-Sheet 15

Inventors
Irving F. Laucks, Ericsson H. Merritt,
Walter D. Lawshe and Theodore W. Dike By Cushman Darby & Cushman
Attorneys

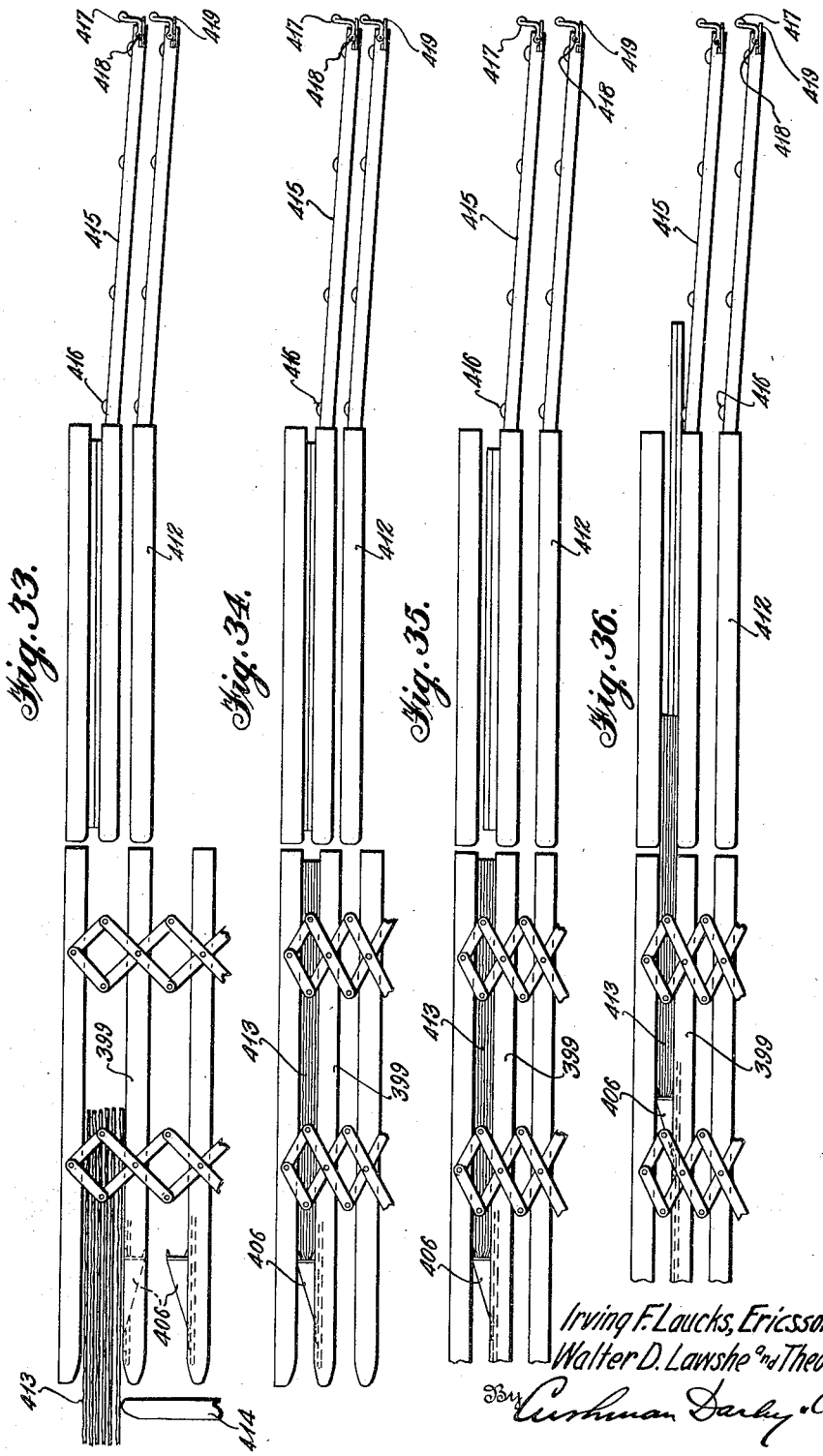

Dec. 4, 1945.   I. F. LAUCKS ET AL   2,390,159
HANDLING AND PRESSING MEANS AND METHOD
Filed May 27, 1940   18 Sheets-Sheet 17

Inventors
Irving F. Laucks, Ericsson H. Merritt,
Walter D. Lawshe & Theodore W. Dike
By Cushman Darby Cushman
Attorneys Dec. 4, 1945.     I. F. LAUCKS ET AL     2,390,159
HANDLING AND PRESSING MEANS AND METHOD
Filed May 27, 1940     18 Sheets-Sheet 18

Inventors
Irving F. Laucks, Ericsson H. Merritt,
Walter D. Lawshe and Theodore W. Dike
Attorneys Patented Dec. 4, 1945

2,390,159

UNITED STATES PATENT OFFICE 2,390,159

HANDLING AND PRESSING MEANS AND METHOD

Irving F. Laucks, Seattle, Wash., Ericsson H. Merritt, Lockport, N. Y., and Walter D. Lawshe and Theodore W. Dike, Seattle, Wash., assignors to I. F. Laucks, Inc., Seattle, Wash., a corporation of Washington Application May 27, 1940, Serial No. 337,540

29 Claims. (Cl. 144—309)

This invention relates to means and method for the handling and treatment of bodies to be pressed, such for example, as assemblies of plies which are to be formed into panels.

In the manufacture of plywood panels, for example, it has heretofore been the usual practice to load assemblies of plies into a multiple opening press by hand, the openings being successively charged. In hot pressing, particularly with the extremely quick setting glues which have been developed, this practice results in a faulty and non-uniform product in view of the fact that the first loaded assemblies are subjected to heat for a longer period than the last loaded assemblies.

It is a purpose of the present invention, in the case of a multiple opening press, to enable the openings to be simultaneously charged, the charged assemblies to be accurately spotted in the press openings, and the incoming assemblies to be utilized by direct contact with previously completed panels to discharge the latter simultaneously from the press openings. To this end, we provide a loader having openings substantially registering, or registrable, with the press openings and we provide means whereby assemblies can be simultaneously pushed from the loader openings into the press openings, the incoming assemblies directly abutting the edges of previously completed panels to eject, or at least to impart an ejecting movement to, the said panels.

In another phase of the invention, we preferably provide shelves for directly receiving the completed panels from the press openings and these shelves may be so arranged and equipped that the original ejecting movement imparted by the incoming assemblies is succeeded by gravitational effect to bring the panels onto the unloading shelves whereon the panels may be retained by suitable abutment means. As a further feature, we may provide a final receiver with means for automatically releasing the abutments in such manner that the panels will pass from the unloading shelves to stacked relation in the receiver.

Unconfined assemblies transferred from the loader to the press are, of course, subjected to top and bottom confinement as they enter the press openings and this will ordinarily be sufficient to prevent any riding up or disarrangement of the leading ends of the assemblies as they engage the edges of the completed panels. Consequently the panels will be positively displaced. However, in order to assure such positive action, we may consolidate the leading edge of the assembly as it enters the press opening or we may subject the entire assembly to consolidation or precompression in the loader, the precompressed condition being maintained in the press opening.

That is to say, we may, for example, provide the press opening with an outward flare so that a wedging compressive action will be exerted on the incoming assembly. Or we may construct the loader with shelves which may be moved apart, so that the free assemblies may be readily loaded thereon, and then moved together to a predetermined extent in order to secure desired precompression. In either event, it will be evident that the maximum necessary press opening will be less than that which would be required to receive a free assembly and, consequently, as another important feature, the time required for opening and closing the press is materially reduced. This, of course, applies regardless of whether a single or multiple opening press is involved. The extent of precompression may vary from a slight compacting action to one which will bring the component plies substantially into general mutual contact.

Under preferred practice, precompression, where the assembly is to be more or less consolidated simultaneously throughout its area, is carried out in a loader having an opening variable between a maximum, wherein the free assemblies can be readily loaded, to a minimum wherein the desired precompression or confinement is achieved. When this minimum is reached, the loader opening is substantially the same as the maximum opening of the press. In speaking of the maximum opening of the press is meant the maximum to which the press is adjusted to receive a precompressed assembly and this maximum will ordinarily be quite substantially less than that which would be required to receive assemblies in free condition. With the loader opening at its minimum and in register with the press opening at its maximum, the assembly can be directly pushed into the press opening in proper position, its confined condition being maintained in the press opening and a previously completed panel being positively engageable for ejection.

Utilizing a loader arranged for precompression, and also the unloading shelves and receiver, it will be evident that a great saving in time and labor is effected and, in the case of a multiple opening press, uniformity of product is assured.

As a further time and labor saving feature, we enable a pile of plies to be loaded into a multiple opening loader without lifting the top assemblies any more than is necessary to free them from the underlying assemblies. To accomplish this result, we may cause the openings of the loader to travel past a pile of assemblies to be loaded or we may cause the pile of assemblies to travel past the openings of the loader.

Practical means for carrying out the above and other purposes of the invention are shown by way of example in the accompanying drawings to which reference will now be made.

Figure 3 is an enlarged elevation, with parts broken away, of the unit of Figures 1 and 2;

Figure 4 is a plan view of the unit;

Figure 5 is a section substantially on line 5—5 of Figure 3;

Figure 6 is a rear elevation of the unit;

Figure 7 is a plan view of a shelf of the unit together with an associated pusher and operating means therefor;

Figure 8 is a section substantially on line 8—8 of Figure 7;

Figure 9 is an end elevation of the mechanism shown in section in Figure 8;

Figure 10 shows the pusher in section substantially on line 10—10 of Figure 11;

Figure 11 is a section substantially on line 11—11 of Figure 10;

Figure 12 is an elevation of a portion of the pusher;

Figures 13, 14 and 15 are wiring diagrams;

Figure 16 is an elevation of a modified form of apparatus for carrying out the invention;

Figure 17 is an enlarged elevation of a detail appearing in Figure 16;

Figure 18 shows in part another form of loader unit;

Figure 19 is a plan view of another form of loader shelf;

Figure 20 is a section on line 20—20 of Figure 19;

Figure 21 is a view similar to that of Figure 20, but showing the parts in different relation;

Figure 22 is a section on line 22—22 of Figure 20;

Figure 23 is a section on line 23—23 of Figure 20;

Figure 24 is a section on line 24—24 of Figure 19;

Figure 25 is a section on line 25—25 of Figure 19;

Figure 26 is a partial plan view of still another form of loader shelf;

Figure 27 is a section on line 27—27 of Figure 26, showing also a partial section of a superposed shelf;

Figure 28 is a section on line 28—28 of Figure 26 with parts in different relation, a portion of a superposed shelf being shown in section;

Figure 29 is a front elevation of a pusher element appearing in Figures 26 to 28;

Figures 33 to 39 illustrate the operating sequence of apparatus including a loader having multiple openings, a multiple opening press, unloading shelves, and a receiver for receiving the panels from the unloading shelves;

Figure 1:
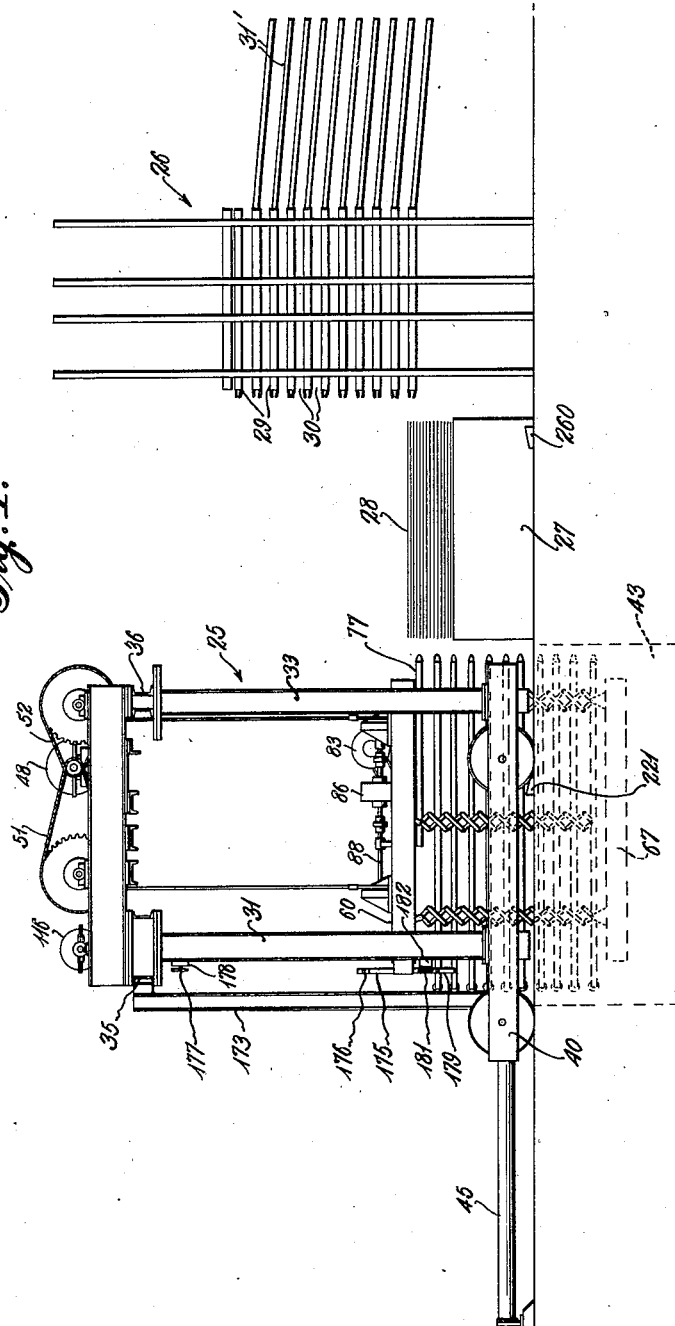
Figure 1 is an elevation of a loader, constituted as a precompression unit, in condition to be charged from a pile of plies, a press being diagrammatically illustrated.

In Figure 1, reference numeral 25 generally designates the precompression unit and loader, reference numeral 26 a press, and reference numeral 27 a table disposed between the loader and press and supporting a pile of plywood assemblies 28. The press may be of any standard construction and comprises plates 29 defining, as here shown, ten openings 30. The press is open front and rear and, as here shown, the rear edges of the plates support shelves 31' adapted to receive completed panels pushed through from the front of the press. In the case of a hot press, the plates may be heated in any convenient manner. In order that panels of different thicknesses may be pressed, the opening extent of the plates is preferably variable. In other words, the maximum opening or daylight should be adjustable. The present invention is not concerned with press structure per se and Patent No. 2,172,003, issued Sept. 5, 1939, to Richard W. Stanley and Ericsson H. Merritt may be referred to as disclosing a suitable press as respects variable daylight.

Figure 2:
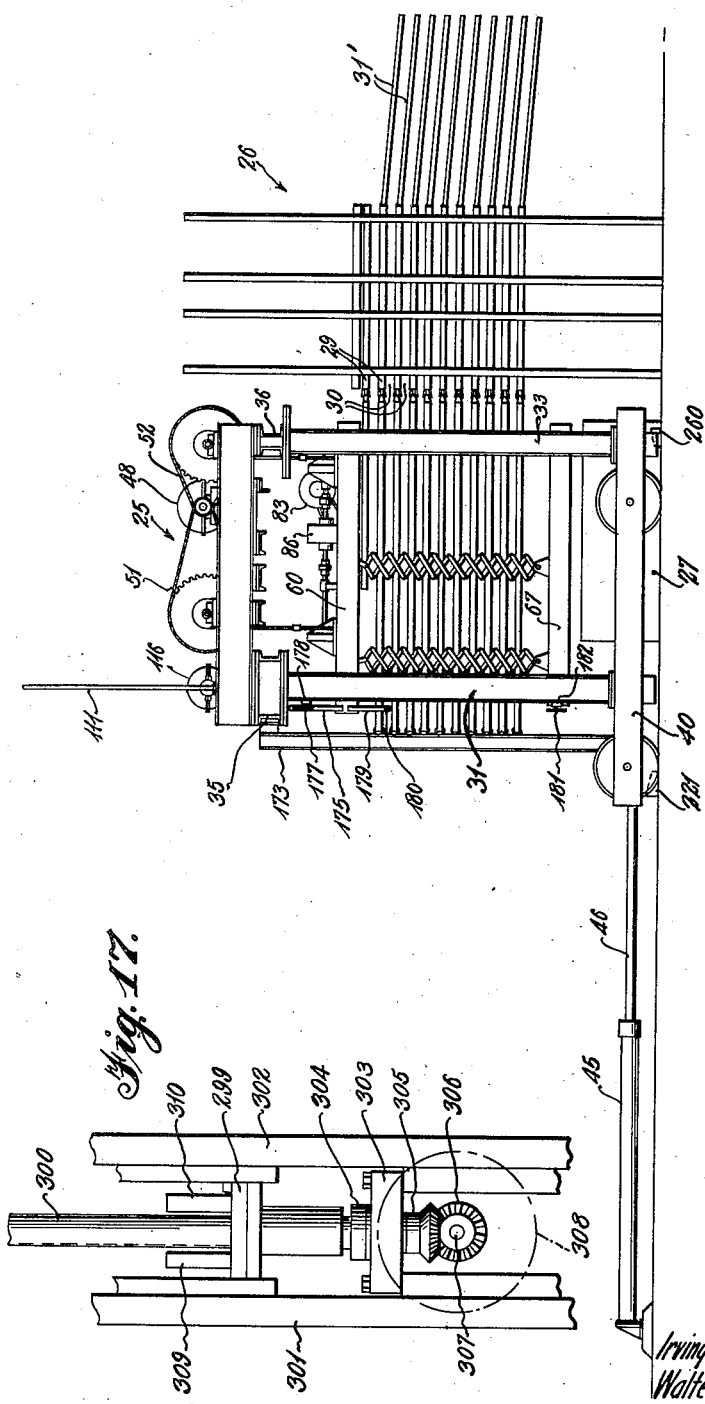
Figure 2 is an elevation of the apparatus of Figure 1 showing the unit in loading relation to the press.

The precompression unit or loader comprises a frame here shown as including four uprights, 31, 32, 33 and 34 connected at their upper ends by transverse members 35 and 36 and longitudinal members as at 37 and 38. The uprights rise from sills 39 and 40 in which are journalled flanged wheels adapted to run on rails 41 and 42 which extend across a pit 43 and up to the front of the press, the pit being disposed adjacent the table 27 at the side of the latter opposite the press. The ends of sills 39 and 40 remote from table 27 are connected by a cross member 44, there being an absence of such a cross member at the front ends of the sills so that the frame can be moved from the position of Figure 1 to the position of Figure 2 wherein the sill members extend along the sides of the table. Movement of the loader between the positions of Figures 1 and 2 is accomplished by means of a hydraulic ram which includes an anchored cylinder 45 and a piston 46 whose free end is connected to the cross member 44.

Supported at the top of the loader frame on a longitudinally extended axis is an electric motor 47 which through a speed reducer 48 drives transversely extending aligned shafts 49 and 50, each of which has two sprockets of the same size at its free end. Through its sprockets and chains 51 and 52, shaft 49 drives sprockets fixed on drums 53 and 54 suitably journalled at the top of the frame on axes parallel to shaft 49. Shaft 50 through its associated sprockets and chains is adapted to drive drums 55 and 56, respectively aligned with the axes of drums 53 and 54. The drums are preferably spirally grooved, as shown, in order to guide the winding and unwinding of four cables of which three, designated by reference numerals 57, 58 and 59, are shown in Figures 3 and 6. The cables are led downwardly and connected at their lower ends to a platform 60 adjacent the corners thereof to support the same for raising and lowering in horizontal position when motor 47 is appropriately driven.

The platform 60 comprises a framework which includes longitudinal members 61 and 62 which lie inwardly of the uprights 31 to 34 of the loader frame and are provided at their ends with rollers as at 63 and 64, Figure 5 (lower left), which co-operate with vertical wear strips as at 65 and 66 on the uprights to guide the platform for vertical movement along the uprights. Beneath platform 60 is a similar frame 67 similarly equipped with rollers for cooperation with the wear strips on the uprights and this frame 67 is connected to platform 60 by means, as here shown, of a group of lazy tongs at each side, each group being made up of three units of which those at one side are designated by the reference numerals 68, 69 and 70 and those at the other side by the reference numerals 71, 72 and 73. The end axes of the lazy tongs extend transversely of the platform 60 and frame 67.

Supported by the intermediate pivot pins of the lazy tong levers in parallel horizontal relation are nine pairs of square section tubular members such as are indicated by reference numerals 74 and 75, Figures 3 and 7. A tenth and lowermost pair of such tubular members, of which one is indicated at 76, Figure 3, is supported by the bottom pivots of the lazy tongs and similarly supported by the top pivots of lazy tongs 67, 70, 72 and 73 is a platen 77.

Supported between members 74 and 75 by means of fittings 78 and 79 is a shelf 80 directly below platen 77, and similar shelves are similarly supported between all the pairs of tubular members. Shelf 80, which is typical of all the shelves, desirably has affixed to its top and bottom surfaces thin longitudinally extending strips as at 81, Figure 7, which terminate forwardly at fingers 82 fixed at the forward edge of the shelf and beveled top and bottom.

Mounted on platform 60 is an electric motor 83 which through endless flexible elements 84 is adapted to drive a suitably mounted shaft 85 which extends transversely of the platform with its ends connected into speed reducers 86 and 87. Aligned shafts 88 and 89 driven from reducer 86 have pinions at their ends which respectively engage vertically reciprocable racks 90 and 91. Pinions similarly driven from reducer 87 similarly engage vertically reciprocable racks 92 and 93. The lower extremities of the racks are connected by rods as at 94 and 95, Figure 3, with frame 67, the racks and connecting rods being disposed to the sides of the tubular members 74 and 75. The lower ends of the rods are engaged with frame 67 through threaded couplings so that the frame can be adjusted into true parallelism with platform 60, thereby to assure the uniform action of the several lazy tongs. It will be evident that by running motor 83 in one direction the racks will move downwardly relative to platform 60, lowering frame 67 and causing a uniform movement apart of the loader shelves to what we shall refer to as expanded or unsqueezing relation. Drive of the motor in the other direction will cause the elevation of frame 67 and the contraction of the lazy tongs so that the shelves will be uniformly moved together to contracted or squeezing relation. In this latter relation the shelf spacing is preferably substantially the same as that of the press plates when the latter are at their predetermined maximum spacing. Operation of motor 47 causes the raising or lowering of the shelves as a group.

The apparatus thus far described is capable of carrying out important functions according to the invention. In Figure 1, the loader shelves are shown in expanded relation and through suitable operation of the elevator motor 47 have been lowered as a group into pit 43. Upon reverse operation of the elevator motor, the shelves, still in expanded relation, are raised as a group and as they move slowly upwardly past the pile of assemblies 28 at the loading station, the assemblies may be conveniently loaded between the shelves by workmen standing at the table ends. Preferably two assemblies are loaded on each shelf. As, or shortly after, the last assemblies are loaded onto the bottom shelf, the elevator motor is stopped and its conventional brake applied with platen 77 in horizontal alignment with the top plate of the press. Motor 83 may now be operated to move the shelves together to a position in which they are in horizontal alignment with the remaining plates of the press, the extent of this movement together being predetermined to provide the desired precompression. The loader as a whole may now be moved by the ram to the position of Figure 2 wherein the shelf fingers 82 are received in recesses at the forward ends of the press plates. In Figures 1 and 2, the forward ends of the plates are shown as being somewhat wedge-shaped so that the forward ends of the press openings are outwardly flared. The precompressed assemblies may now be pushed from the loader openings into the press openings, the state of confinement arrived at in the loader being retained in the press so that panels in the press openings may be pushed out of the latter onto the receiving shelves 31 without any disarrangement of the leading ends of the incoming assemblies. As heretofore emphasized, the press openings are at a maximum considerably less than that which would be required to freely receive the free assemblies and consequently once the press has been charged the pressing operation therein is completed with a minimum of closing movement. This quick action is important not only in effecting a considerable saving of time but also in effecting compression of the assemblies before there can be any premature setting of a quick setting glue. Simultaneous loading of the press openings is also of importance in this connection. During the operation of the press, the loader is moved back to its position of Figure 1, the shelves lowered and expanded, and recharged from a renewed pile 28 on table 27. By or before the time the press operation is completed, the loader will ordinarily have been recharged so that the press can be reloaded without loss of time.

It has been above stated that in their contracted relation, the loader shelves define minimum openings which are about the same as the maximum press openings. Actually the minimum press openings might be such that the assemblies therein would not be sufficiently compressed to enable them to act efficiently as pushers for the completed panels in the press openings. In such case, with the press openings at a proper maximum, their flared mouths will exert a compressing action on the incoming assemblies so that their thickness will be reduced and confined to enable the leading ends of the assemblies to properly engage and push out the engaged panel.

Desirably, means are provided, carried by the loader, for simultaneously pushing all the precompressed assemblies from the loader openings into the press openings, and desirably the pushing means serve as abutments to properly position the assemblies on the loader shelves. To this end each of the loader shelves may have an associated pusher, together with operating means therefor, the pusher having a front end which in normal position will limit the extent of insertion of the assemblies and will assure that the assemblies are squarely positioned transversely of the opening. In this particular, the typical equipment of shelf 80 will be described.

The rear portions of members 74 and 75, Figures 7, 8 and 9, are connected by a cross member 100. A bracket 101 secured between member 100 and the rearwardly projecting portion of member 75 provides vertical bearings 102 and 103 for the hub portion 104 of a sprocket 105 and the stud portion 106 of a sprocket 107. Nuts 108 and 109 hold the sprockets for rotation in the same horizontal plane. Hub 104 has a square opening wherein is set a square bushing 110, in which is slidably engaged a square shaft 111. The lower end of this shaft is mounted in a pillow block 112, Figure 3, on frame 67 and the other end of the shaft extends slidably through the square opening of a bevelled pinion 113 suitably mounted on top of the loader frame, Figure 4. Pinion 113 is engaged by a pinion 114 fixed on a shaft 115 which is driven from a gear reducer 116 by an electric motor 117. Pillow block 112, while supporting shaft 111 for rotation, engages its lower extremity in such manner that the shaft is forced to follow the up and down movement of frame 67. Consequently shaft 111 is of considerable length so that it will still be in pinion 113 when the shelves are in the lowered and expanded position of Figure 1.

Secured against the outer face of member 75 opposite sprocket 107 is a bracket 118 having a guide channel 119 of generally C-section in which is slidable a block 120 in the longitudinal direction of member 75. A vertical stud set in block 120 supports a sprocket 121 for rotation in the plane of sprockets 105 and 107. A pin 122 set in the rear end of block 120 projects rearwardly through an aperture in a plate 123 fixed to the rear end of bracket 118 by screws 124 and 125. Pin 122 has an abutment nut 126 at its outer extremity and a compression spring 127 is interposed between this nut and the plate 123. Projecting from the forward end of block 120 is a finger 128 having a bevelled extremity 129 normally somewhat to the rear of a rectangularly projecting plunger 130 of a limit switch 131.

At its forward end member 75 has a bracket 132 secured against its outer face, this bracket supporting for rotation a vertical stud to which is fixed a sprocket 133 in the plane of sprockets 105, 107 and 121. A sprocket chain 134 is engaged with sprockets 105, 107, 121 and 133, the arrangement being such that the chain has an inner run guided on top of member 75 and an outer run which may lie within a channel guard 135 supported by brackets as at 136 fixed to the outer face of member 75. The sprockets and the portion of the chain to the rear of member 100 may be enclosed in a guard 136. In like manner, members 74 and 100 support a chain 137 with an inner run supported on top of member 74, the chain being drivable from a sprocket 138 slidable on a squared shaft 139 whose upper end extends through the square opening of a bevel pinion 140 engaged by a pinion 141 on a shaft 142 aligned with shaft 115 and drivable at the same speed as the latter from the reducer 116. The lower end of shaft 139 is supported on frame 67 in the same manner as the lower end of shaft 111.

A pusher 143 extends between the inner runs of chains 134 and 137 and has its ends connected to these runs by means of fittings 144 and 145. With the pusher in its rearward position shown in Figure 7, its forward portion 146 rests on the rear upper margin of shelf 80. This portion 146 has a forward rectilinear edge parallel to the transverse edges of the shelf and serves as an abutment for assemblies loaded in from the front, serving to position the assemblies squarely thereon.

It will be evident that by driving motor 117 in one direction, the inner runs of chains 134 and 137 will be caused to travel forwardly and consequently will propel the pusher forwardly over shelf 80 so that the pusher will in turn propel assemblies on the shelf from the latter. It will be noted that the forward edge of portion 146 of the pusher is considerably in advance of fittings 144 and 145 so that when the latter reach the forward sprockets the said edge will be considerably beyond the forward edge of the shelf, thus enabling the assemblies discharged from the loader shelf to be completely positioned in a press opening when the loader and press are in the relation shown in Figure 2.

By means to be hereinafter described, the shelves are movable to and from a variable minimum spacing in order that, as to any panel thickness, the desired degree of precompression can be obtained, and also in order that varied panel thicknesses may be handled. At any predetermined minimum spacing of the shelves it is desirable that the leading portion 146 of the pusher completely fill the space vertically so that it will engage all plies of the assemblies which are in the loader opening. To this end portion 146 may be conveniently constructed as particularly shown in Figures 10 to 12.

Referring to these figures, reference numeral 147 designates an upwardly open channel which has upturned ends as at 148, Figures 10 and 12. One longitudinal wall of the channel has riveted thereto strips 149 and 150 which are secured to the top and bottom margins of the rearwardly lying portion of the pusher as shown in Figures 7 and 12. Longitudinally slidable within channel 147 on the bottom wall thereof is a rigid strip 151 which has fixed thereon at intervals blocks 152 having inclined or wedge faces 153.

A downwardly open channel 154 is telescoped within channel 147 and has downwardly turned end walls as at 155. Fixed to the bottom surface of the channel are wedge blocks 156 having faces mating with the faces of blocks 152 in the manner particularly shown in Figure 10.

Secured to the right-hand end of the right-hand block 152, Figure 10, is a pin 157 which extends through a downwardly open slot in end wall 155 and through an aperture in end wall 148, the pin having a threaded extremity with which is engaged a nut 158. A fairly powerful compression spring 159 surrounding pin 157 is engaged between the said block 152 and the end wall 155, this spring tending to urge strip 151 and all of the blocks 152 to the left, Figure 10. It will therefore be seen that by loosening nut 158, the channels will be forced apart by the action of the spring causing blocks 152 to wedge blocks 156 outwardly. Thus the thickness of pusher portion 146 can be varied from a minimum which is obtained when blocks 152 and 156 individually completely fill the space between the channel webs, to a maximum which is obtained when the flat top surfaces of blocks 152 are under the flat bottom surfaces of blocks 156. The end walls as at 148 and 155 are secureable together in adjusted position by means of bolts as at 160 and 161 which are passed through vertical slots in the said end walls. Centrally the web of channel 154 has secured thereto two pairs of bowed leaf springs 162, 163, and 164, 165, Figure 11, whose free ends extend along the channels from the common point of connection of each pair. Springs 164 and 165 respectively extend under pins 166 and 167 which are fixed in apertures in the side flanges of channel 147 and are received in downwardly open slots in the side flanges of channel 154. The ends of springs 162 and 163 are respectively engaged under the pins 166 and 167. These springs are so biased as to act yieldingly to hold the channels against separation.

As pusher 143 is moved forwardly over shelf 80 to eject precompressed assemblies thereon, there is, of course, substantial resistance to its movement although this resistance is minimized by the strips 81 which reduce the frictional effect. In order to support the reaction we provide the rear ends of members 74 and 75 with rollers 168 and 169 which bear against, and are adapted to travel up and down on, wear strips 170 and 171 secured against uprights 172 and 173 of the loader frame. Should resistance beyond the ordinary be encountered, for example by the portion of pusher 143 adjacent chain 134, the resultant tensioning effect on the chain will cause it to pull block 120 against the action of tensioning spring 127 so that the bevelled end 129 of finger 128 will strike and move plunger 130 of limit switch 131 to open the latter so that the pusher drive will be interrupted in a manner which will be later described. Under similar tensioning of chain 137 a limit switch 131', Figure 7, will be operated to interrupt the pusher drive. Of course, with an evenly balanced extraordinary resistance to the pusher 143, both of switches 131 and 131' will be opened, but in any event one of these switches will be opened in case the pusher meets with unusual resistance.

Referring now particularly to Figures 1, 2 and 6, reference numeral 175 designates an upwardly projecting arm secured on the right-hand side of platform 60 adjacent frame upright 31. Arm 175 is provided with a longitudinally extending slot and bolted through this slot is the base portion of a laterally projecting dog 176 which is adapted to cooperate with the forked actuator 177 of a limit switch 178 secured to upright 31. Due to the bolt and slot connection, the dog can be adjusted longitudinally of arm 175 so as to actuate the limit switch at the desired point in the movement of platform 60.

A downwardly projecting arm 179 secured to platform 60 beneath arm 175 has secured to it through a similar bolt and slot connection a dog 180 for cooperation with the forked actuator 181 of a limit switch 182 secured to upright 31.

Secured to the rear of frame 67 at their lower ends is a pair of vertically extending racks 183 and 184 whose upper ends are slidably guided in channels 185 and 186 fixed to the rear of platform 60. The rack teeth are forwardly faced and engage pinions 187 and 188 fixed on the ends of a suitably journalled horizontal shaft 189, Figures 5 and 6. By this equalizing arrangement, it is assured that platform 60 and frame 67 will not assume transverse inclination relative to each other. Fixed to the upper end of rack 183 through suitable spacers is a downwardly extending parallel bar 190 on which is a longitudinally adjustable dog 191 adapted to cooperate with the roller arm 192 of a limit switch 193 mounted on platform 60. Rack 184 carries a similar bar 194 provided with a longitudinally adjustable dog 195 cooperable with the forked actuator 196 of a limit switch 197 mounted on platform 60.

Limit switches 178, 182, 193 and 197 are arranged to control the elevator motor 47 and the squeeze motor 83 in a manner which will be later described. The action of these switches may be independent of or modified by a further limit switch 198 shown in Figure 6, lower left, and supported on a frame upright 199. Switch 198 has a roller arm 200 which is successively engageable by rearwardly projecting fingers 201 of which there is one at each shelf except the lowermost. In Figure 7, the finger 201 associated with shelf 80 is shown as projecting from a bracket similar to the bracket 101 of Figure 8. The finger projects horizontally and has an only upwardly breaking joint 202, the arrangement being such that as the shelves are elevated as a group the fingers, when operatively positioned, will successively engage the arm of switch 198, which is spring biased to closed position, to open the switch and stop the elevator motor 47. When the shelves are lowered the joints of the fingers break on encountering the switch arm so that the operation of motor 47 is not affected. The fingers can be folded back on themselves so as to be rendered inoperative to engage arm 200 during upward movement of the shelves.

Supported on platform 60 on squared shaft 139 is a sprocket 203 and suitably mounted on brackets on platform 60 are sprockets 204 and 205. These three sprockets are in the same plane and are engaged by a chain 206 whose run between sprockets 204 and 205 is slidable on a plate 207 on platform 60. Chain 206 has secured thereon a dog 208.

Adjacent sprocket 204, plate 207 has secured thereto through longitudinally extending slots a pair of L-section guide members 209 and 210. Supported on guide member 209 is a limit switch 211 having a roller arm 212 engageable by dog 208. A pair of L-section guide members 213 and 214 are secured on plate 207 adjacent sprocket 205 and member 214 supports a limit switch 215 having a forked actuator 216 with which dog 208 is cooperable.

Chain 206 constitutes a pilot chain driven concomitantly with the left-hand pusher chains as at 137, Figure 7, and dog 208 controls switches 211 and 215 which in turn control the pusher motor 117. It will be evident that these switches can be adjusted with their supporting members 209 and 214 longitudinally of the run of chain 206 between sprockets 204 and 205 for the purpose of timing the action of dog 208.

In Figure 13, we have shown a suitable wiring diagram for the elevator motor 47 and squeeze motor 83, this diagram including the above-described limit switches 178, 182, 193, 197 and 198. Referring to this figure, the motors 47 and 83 are shown as being of the three phase type and the power line is shown as including the conductors L1, L2 and L3. A lead 215 from conductor L1 has interposed therein an emergency stop switch 218 and a limit switch 219 which precludes operation of the motors unless the loader carriage is in proper register over pit 43. The switch 219 includes a pivoted contactor arm 220 which is biased toward open position. When the carriage is in proper register with the pit 43, the free end of arm 220 is engaged by the top inclined surface of an abutment 221, fixed externally of the carriage, so that switch 219 is closed as shown.

The limit switch 178 includes a contactor arm 178a which in the full line position shown closes a conductor 222 up to a push button switch 223 which is the elevator "up" button. When the button is pressed, a circuit is completed from lead 215 to lead 216 through the coil 224 of a relay 225. Energization of the coil moves the four contactor elements 226, 227, 228 and 229 of the relay into circuit closing position, contactor element 226 completing a holding circuit through a coil 224 and limit switch 198 around push buttom switch 223. Contactor elements 227, 228 and 229 establish a forward driving circuit up to motor 47 from leads 215, 216 and 217 respectively.

When arm 178a of switch 178 is in the dotted line position of Figure 13, it completes a circuit through a conductor 230 and limit switch 197, arm 197a being in the full line position of Figure 13, to the coil 231 of a relay 232, the other end of the coil being in connection through a lead 216' with conductor L2. Energization of coil 231 causes contactor elements 233, 234 and 235 of relay 232 to move to circuit closing position so that a forward driving circuit is established from leads 215', 216' and 217' up to the motor 83.

A conductor 236 extends from lead 215 through limit switch 182, having a contactor arm 182a assumed to be in the full line position of Figure 13, and through a push button switch 237 up to the coil 238 of a relay 239, the other end of coil 238 being in connection with lead 216. Push button switch 237 is the elevator "down" button. Relay 239 has four contactor elements 240, 241, 242 and 243 and when switch 237 is closed a circuit is completed through coil 238 so that these contactor elements are moved to circuit closing position. Contactor element 240 then completes a holding circuit through coil 238 around push button switch 237, and contactors 241, 242 and 243 respectively connect leads 217, 216 and 215 to motor 47 so that the latter is driven in reverse.

When arm 182a of limit switch 182 is in the dotted line position of Figure 13 a circuit is completed through a conductor 244, in which limit switch 193 is interposed, up to the coil 245 of a relay 246, the other end of coil 245 being in connection with lead 216'. Relay 246 has three contactor elements 247, 248 and 249 which upon energization of coil 245 move to respectively connect leads 217', 216' and 215' up to motor 83 so that the latter is driven in reverse.

With the elevator constituted by platform 60, the shelves, and frame 67, in its lowermost position and the loader shelves in fully expanded relation, switch 193 is open and arm 182a of switch 182 is in its dotted line position. Arm 178a of switch 178 and arm 197a of switch 197 are in their full line positions. Switch 219 is closed since otherwise the shelves could not have been previously lowered into pit 43.

Upon pressing the button to close switch 223, motor 47 is started and the elevator moves upwardly at such a speed that the loading crew can readily load the assemblies onto the shelves as the latter move past the loading station. At the start of the upward movement dog 180 strikes the upper arm of the forked actuator 181 so that contactor arm 182a of switch 182 is snapped to its full line position. As platform 60 comes into the position shown in Figures 2 and 6, dog 176 strikes the upper arm of the actuator fork 177 so that the latter snaps to the full line position shown in Figure 6 and contactor arm 178a is thus caused to assume the dotted line position of Figure 13. Coil 224 of relay 225 is thus de-energized so that the contactor elements 226 to 229 move to open position, stopping motor 47, and the conventional automatic elevator brake is applied. It will be evident that the adjusted position of dog 176 along arm 175 will determine the point at which upward movement of the elevator will be stopped. As previously described, arm 178a in its dotted line position causes the energization of coil 231 of relay 232 so that a forward driving circuit is completed up to motor 83. Consequently the shelves are contracted and when the desired degree of contraction is attained dog 195 strikes the upper arm of actuator fork 196 of switch 197 so that arm 197a of the latter is snapped to the dotted line position of Figure 13 so that motor 83 stops and the conventional automatic elevator brake is applied. The adjusted position of dog 195 on bar 194 of course determines the extent of closing movement of the shelves and consequently the degree of precompression of the assemblies. As contraction starts, dog 191 moves upwardly away from arm 192 so that switch 193 is closed by its spring.

In the operations above described, the fingers 201, Figures 6 and 7, are assumed to have been thrown back about their hinges so as to be inoperative to open limit switch 198 and consequently the upward movement of the elevator has been continuous. Under some circumstances, it may be desirable to notch the elevator upwardly and in this event fingers 201 are disposed in the extended relation shown in Figure 7. Thus as each shelf reaches switch 198, it will be opened and upward movement of the elevator stopped, to be resumed upon depression of the button switch 223. It will be understood that as the button is depressed, the finger 201 which has engaged the actuator arm 200 of switch 198 will immediately move away from the arm so that the switch closes, upward movement continuing until the next lower shelf comes up to switch 198. In either system, limit switch 197 is finally operated to arrest the squeeze movement.

The next step in the sequence of operations is to move the loader up to the press, which relation is shown in Figure 2.

Referring to Figure 14, reference numeral 250 designates a three phase motor connected to a pump, not shown, for the supply of fluid under pressure to ram cylinder 45. When arm 197a of limit switch 197 is in the dotted line position of Figure 13, which is the full line position shown in Figure 14, it closes a lead 251 from conductor L1 through an emergency stop switch 252 up to a push button switch 253. Depression of the button of switch 253 causes energization of the coil 254 of a relay 255 so that a holding circuit is established for the coil and a driving circuit is completed up to motor 250. The pump output is controlled by conventional valves so that the loader can be moved up to the press, stopped, and then returned to its position over the pit. It will be evident that motor 250 cannot be operated unless limit switch 197 has been actuated as the result of the completion of the squeeze movement of the shelves. This obviates any danger of advancing the loader before frame 67 has cleared the pit and the loading table 27.

The next step in the operation is the simultaneous discharge of the assemblies from the loader shelves into the press openings, this, it will be remembered, being accomplished by the pushers 143 which are driven from motor 117. This involves operation of the system shown in Figure 15. Referring to this figure, a lead 256 from conductor L3 has interposed therein an emergency push button switch 257, the limit switch 131 which has a contactor arm 131a, and a limit switch 259. Switch 259 includes a contactor arm 259a biased to open position but engaged and closed by the inclined surface of an externally fixed abutment 260 when the loader carriage is in discharging relation to the press as in Figure 2. A conductor 261 is in connection through limit switch 215, when the arm 215a of the latter is in the full line position shown, with a push button switch 262 from which a conductor runs to one end of the coil 263 of a relay 264, the other end of the coil being in connection with a lead 265 from conductor L2. Relay 264 includes four contactor elements 266, 267, 268 and 269 which are moved to circuit closing position upon depression of the button of switch 262. In this manner a holding circuit is established and leads 256, 265, and a lead 270 from conductor L1, are connected to motor 117 so that the latter will be driven in a forward direction. It will be evident that with arm 215a of switch 215 in the dotted line position of Figure 15, a circuit will be completed through the arm 211a of switch 211 between leads 256 and 265 thus energizing the coil 271 of a relay 272 which has the four contactor elements 273, 274, 275 and 276 so that these elements will be moved to circuit closing position. A circuit for coil 271 is thus established through contactor element 273 independently of arm 215a of switch 215 and a reverse driving circuit is established up to motor 117.

When the button of switch 262 is depressed, arm 215a of switch 215 being in the full line position, relay 264 is actuated and motor 117 is driven so that the pushers are all propelled forwardly over their respective shelves. This forward movement is stopped when dog 208 on pilot chain 206 strikes the far arm of the actuator fork 216, Figure 5, whereupon arm 215a of switch 215 is snapped to the dotted line position, Figure 15, so that, arm 211a of switch 211 being closed, motor 117 is reversely driven and the pushers are returned. As soon as this return movement starts, dog 208 engages the other arm of the actuator fork 216 so that contactor arm 215a of switch 215 is returned to its full line position. This, however, does not affect the reverse drive of motor 117 since coil 271 is maintained energized through the contactor element 273 of relay 272. Return continues until the dog 208 strikes the arm 212 of switch 211 to open the latter. This switch again closes by spring action as soon as dog 208 leaves it upon depression of the button of switch 262 to again initiate forward drive of motor 117.

As heretofore described, undue resistance to the pusher 143, Figure 7, may cause switch 131 to open so that motor 117 will be stopped. In the diagram Figure 15, we have not indicated the opposite limit switch 131' and of course all the other pushers will have similarly a pair of these limit switches. They will all ordinarily be connected in series and consequently it has been thought sufficient to indicate merely the switch 131 in Figure 15.

The control valves for controlling the fluid supply to ram cylinder 45 are now operated so that the loader carriage is returned to its position over pit 43, switch 259 opening so that the pusher motor 117 cannot be operated and switch 219 closing when proper register over the pit has been reached. It is now necessary to lower the elevator and expand the shelves so that the loading cycle can be repeated.

Upon depression of the button of switch 237, Figure 13, coil 238 of relay 239 is energized and consequently motor 47 is reversely driven so that the elevator starts down. Dog 176 immediately strikes the lower arm of the actuator fork 177 of limit switch 178 so that arm 178a is snapped to its full line position in readiness for the next "up" operation. When dog 180 strikes the lower arm of actuator fork 181, the contactor arm 182a of switch 182 is snapped to its dotted line position thereby stopping motor 47. Contactor arm 193a of switch 193 closed as soon as the previous contraction of the shelves started, as previously mentioned, so that now a circuit is established through coil 245 of relay 246 and motor 83 is placed in connection with the line for reverse drive, thereby causing the shelves to expand. Dog 195, immediately engaging the lower arm of the forked actuator 196, causes contactor arm 197a of switch 197 to snap to its full line position. When the shelves have been expanded to the desired extent, dog 191 strikes actuator arm 192 so that the contactor arm 193a of switch 193 is moved to open position, thus stopping motor 83. The "up" operations may now be repeated upon depression of the button of switch 223.

In view of the adjustability of the operating dogs for the limit switches, it will be seen that the top and bottom limits of movement of the elevator can be readily varied and the maximum and minimum openings between the shelves can also be readily varied in accordance with conditions to be met. Moreover the normal rest relation of the pushers to the shelves as well as their range of travel from rest can be varied through adjustment of switches 211 and 215 longitudinally of the plate 207. Furthermore, according to the preferred system just described, the shelves cannot be lowered unless they are in register with the pit and the pushers cannot be operated unless the loader is in charging relation to the press. Damage due to the sticking of the assemblies between the shelves is prevented by the limit switches as at 131. In short, the sequence of loading operations is carried out, under the invention, with the greatest possible speed, efficiency, and safety, and with a minimum of manual labor.

In Figure 16 we have shown a somewhat different system for accomplishing the objects of the invention. Referring to this figure, reference numeral 280 designates generally a pusher unit; reference numeral 281, an elevator; reference numeral 282, a precompression unit; and reference numeral 283, a press which may be the same as that shown in Figures 1 and 2.

The pusher unit comprises an elongated base frame 284 mounted on flanged wheels for travel on track rails up to the precompression unit. Corner uprights as at 285 and 286 rise from the base frame and their upper ends are joined by a top framework 287. The rear uprights as at 285 are connected by a transverse member 288 spaced well above the base frame, and the uprights at each side are connected by longitudinal members as at 289.

Mounted between the track rails on a fixed base 290 is a motor 291 adapted to drive a speed reducer 292 which has an output pulley 293 around which is taken a turn of a cable 294 whose ends are anchored to the framework at points adjacent the front and rear of the base frame. When the motor is driven, pulley 293 will take in and pay out the end portions of cable 294 and the carriage will be traversed in one direction or the other, depending upon the direction of rotation of motor 291.

Pivoted at their upper ends to the top framework 287 at the sides thereof are pairs of lazy tongs as at 295 and 296, the lower ends of the lazy tongs being pivoted to a slab or frame 297. Supported by the intermediate pivots of the lazy tong levers is a group of horizontally extending pushers 298, these having a considerable extent of projection forwardly of the framework.

A nut 299 in which is threaded a vertical screw 300 (see also Figure 17) is slidably guided and held against rotation between uprights 301 and 302 which extend between the top framework 287 and the longitudinal member 289. The screw 300 is supported on a block 303, which extends between uprights 301 and 302, by a thrust collar 304, and at its lower end has fixed thereon a bevel pinion 305 which is engaged by a bevel pinion 306 on a cross shaft 307 rotatable by means of a handwheel 308. The nut 299 and its supporting and driving means are duplicated on the other side of the frame, and supported on the two nuts are a pair of cross bars 309 and 310 on which frame 297 rests. By turning the handwheel 308 frame 297 can be adjusted up and down, thereby simultaneously and uniformly adjusting the spacing of the pushers 298.

The elevator 281 includes a platform 311 supported on the vertical plunger 312 of a ram 313 disposed in a pit 314 into which the platform may be lowered to some extent to bring rails mounted thereon into alignment and flush with the rails which support unit 280 in the position of Figure 16. Between these rails the platform supports a table 315 adapted to receive a pile of assemblies, and at the forward edge of this table is a transversely extending barrier 316 having a top edge spaced sufficiently above the top of table 315 so that it is somewhat above a full charge of assemblies on the table.

The loader unit 282 comprises an upright framework 317 supported on wheels adapted to run on rails in alignment with the pusher unit 280 and the press 283. Fixed within frame 317 is a horizontal platen 318 to the sides of which are pivoted pairs of lazy tongs as at 319' and 320, these supporting at the intermediate pivots of the levers a group of shelves 319. These shelves may be expanded and contracted by means as heretofore described in connection with the first embodiment. When the shelves are contracted, their openings are in alignment with the pushers 298 and with the openings of press 283.

In the use of this apparatus, unit 282 is moved somewhat toward the barrier 316 so that there will be no conflict between the shelves 319 and the press plates, and the shelves are expanded to their predetermined maximum. Workmen on platform 311 at the ends of a pile of assemblies on table 315 are now enabled to conveniently charge the shelves as the ram is controlled to move the elevator slowly upwardly. When a long assembly is lifted by its ends, it sags considerably in the middle, thus making loading into a relatively narrow opening somewhat difficult. However, by resting the assembly on the top of barrier 316, it will flatten out so that it can be readily pushed over the barrier and onto the adjacent shelf 319.

When this loading operation has been completed, the elevator is lowered to the position shown, whereupon the pusher unit is propelled forwardly to project the pushers 298 between the contracted shelves and thereby push the precompressed assemblies from the shelves into the press openings, unit 282 having previously been moved to bring its shelves against the press plates as shown. The pushers 298 are sufficiently long so as to be able to push the assemblies completely into the press openings; i. e., so that the rear edges of the assemblies are behind the front edges of the press plates. The incoming assemblies, as before described, engage previously completed panels in the press openings and eject the latter from the press.

In the preceding description of the two embodiments of the precompression unit, it has been assumed that the openings should be variable as to maximum and minimum in order to handle assemblies for panels of different thicknesses. Also, the openings of the hereinbefore described precompression units are simultaneously and uniformly closed. However, where production is limited to a single panel thickness, openings with fixed maximum and minimum may be utilized. In any case, the openings may close successively.

In this connection, we have shown in Figure 18 a precompression unit which is an adaptation of the press shown in Patent 2,148,704, issued February 28, 1939, to Ericson H. Merritt. In this figure, reference numeral 325 designates a fixed top platen, and reference numeral 326, a bottom platen movable up and down by a ram piston 327. A shelf 328 is suspended from the top platen by bolts as at 329, and other shelves are similarly supported beneath the shelf 328. As the bottom platen moves upwardly, the openings are successively closed from the bottom upwardly, closing movement being limited by stops as at 330 which may be in the form of ribs disposed adjacent the sides of the opening and extending longitudinally thereof. Of course, in this case the extent of opening can be varied by adjusting the nuts on the suspension bolts, and the closing extent can be varied by using stop ribs of different thickness.

In Figure 19, we have shown a loader shelf of skeleton form. The shelf includes a frame comprising a rear bar 340, a forward bar 341, and side bars 342 and 343 which are offset to provide rear recesses 344 and 345. Extending between bars 340 and 341 are a number of longitudinal members 346, 347, 348, 349 and 350. Each of these is constituted by a bottom member in the form of a square metal tube as shown at 351, Figure 24, along the top of which runs a wooden strip as at 352 which has secured to its top face a thin metal strip or skid as at 353 (Figure 19). At the sides of member 348, bars 340 and 341 are connected by square metal tubes 354 and 355, to which are secured angle brackets as at 356 and 357, Figure 22, which support leaf springs 358, 359 and 360, 361, respectively, the top surfaces of these springs normally lying in the planes of the top surfaces of the skids as at 353.

Referring to Figures 20, 21 and 23, wooden strips 362 and 363 are secured to the sides of the square tube 354 and are capped by a metal skid strip 364 whose top surface is coplanar with the top surfaces of the other skid strips. The square tube 355 similarly supports a skid strip 365 in continuation of the springs 360 and 361. The shelf is supported rearwardly by pairs of lazy tongs 366, 367 and 368, 369, and forwardly by a pair of lazy tongs 370, 371. The opening and closing movements of the shelves may be controlled exactly as described in connection with the first embodiment.

In the lower right hand corner of the shelf frame, Figures 19 and 25, is fixed a block 372 in which a sprocket 373 is journalled on an upright axis and restrained against upward displacement by a member 374 secured to the block. Sprocket 373 has a square opening which receives a square shaft 375 which may be driven and controlled in the manner described in connection with the first embodiment. An endless chain 376 is engaged with sprocket 373 and extends diagonally rearwardly to a sprocket 377 mounted on a block 378 which is secured in front of bar 340 by means of cap screws passed through the latter, the block being thus adjustable somewhat toward and away from the bar for the purpose of chain tensioning. Figure 24 shows the chain 376 passed through a slot in the wooden strip 352, the slot being bridged by a removable piece 353' of the skid 353. This arrangement is used wherever the chain crosses one of the longitudinals.

From sprocket 377 the chain is led directly forwardly to a sprocket 379 and then diagonally rearwardly to a sprocket 380 supported in the manner of sprocket 377. From sprocket 380 the chain is led directly forward to a sprocket 381, and thence back to sprocket 373. There is thus provided the parallel chain runs 376a and 376b which are perpendicular to the frame bars 340 and 341.

Pivoted between blocks 382 and 383 secured at opposite points to the parallel runs 376a and 376b is a pusher 384 having a nose portion 385 of substantial thickness which, in the position shown in the drawings, is supported on the free ends of springs 358 to 361.

It is assumed that the described shelf constitutes the lower boundary of a loader opening. When an assembly is pushed into the opening from the rear, that is over bar 340, the pusher 384 will be depressed and will take the position shown in Figure 21, this being permitted by the fact that the pusher nose is upwardly recessed as at 386 to provide clearance for members 354 and 355. When the trailing edge of the assembly has passed nose 385, the springs return the pusher 384 to the position of Figure 20, where its nose is adapted to engage the assembly when the chain runs 376a and 376b are driven forwardly from the squared shaft 375. The recesses 344 and 345 enable the workmen to push the assembly the proper distance into the opening, and while the rear corners of the assembly will ordinarily not be within the loader opening, this is of no consequence. It will be seen that the nose of the pusher can be projected well beyond bar 341 so as to spot the assembly properly in the press opening.

The arrangement just described is advantageous in that while it is self-contained as to the pusher means, the loader can be loaded from the rear without the necessity of moving it away from the press as in the case of the first described embodiment.

Referring to Figures 26 to 29, reference numeral 390 designates a portion of a shelf frame which may be assumed to be generally similar to that shown in Figure 19. In this case, the frame carries two parallel endless chains in planes perpendicular to the plane of the shelf, one of these chains being shown in part and being designated by reference numeral 391. Pivoted to the top runs of these chains by means of coaxial pins as at 392 is a pusher 393 whose forward end, in the retracted position of the pusher, Figures 26 and 27, rests on the rear margin of a plate 394 which forms the bottom of the shelf. The pusher comprises an upper part 393a and a lower part 393b which are hinged together by the pins as at 392. The lower part can be collapsed within the upper part and the two parts are normally held in spread relation by compression springs as at 395, the maximum spread being indicated in Figures 27 and 29. Referring to the latter figure, it will be observed that the upper and lower parts have crenelated flanges at their forward ends so that a substantial pushing surface is provided, the crenelations being staggered to permit vertical collapse of the pusher. The minimum thickness of the pusher nose is the depth of one of the end flanges.

A forwardly and upwardly inclined plate 396 extends between the bottom plate 394 and a top plate 397 of the shelf. With the pusher in the position of Figures 26 and 27, an assembly may be loaded over the top thereof without interference and into the space between the top plate 397 and the bottom plate 398 of a superposed shelf. When the chains are driven in a manner to advance the pusher, the pusher nose will ride up on plate 396 into the opening between the shelves and will automatically adjust itself to the depth of that opening, assuming the latter to be of less depth than the maximum pusher thickness. In this manner, it is assured that the assembly will be engaged throughout its thickness for positive discharge from the loader.

Figure 30:
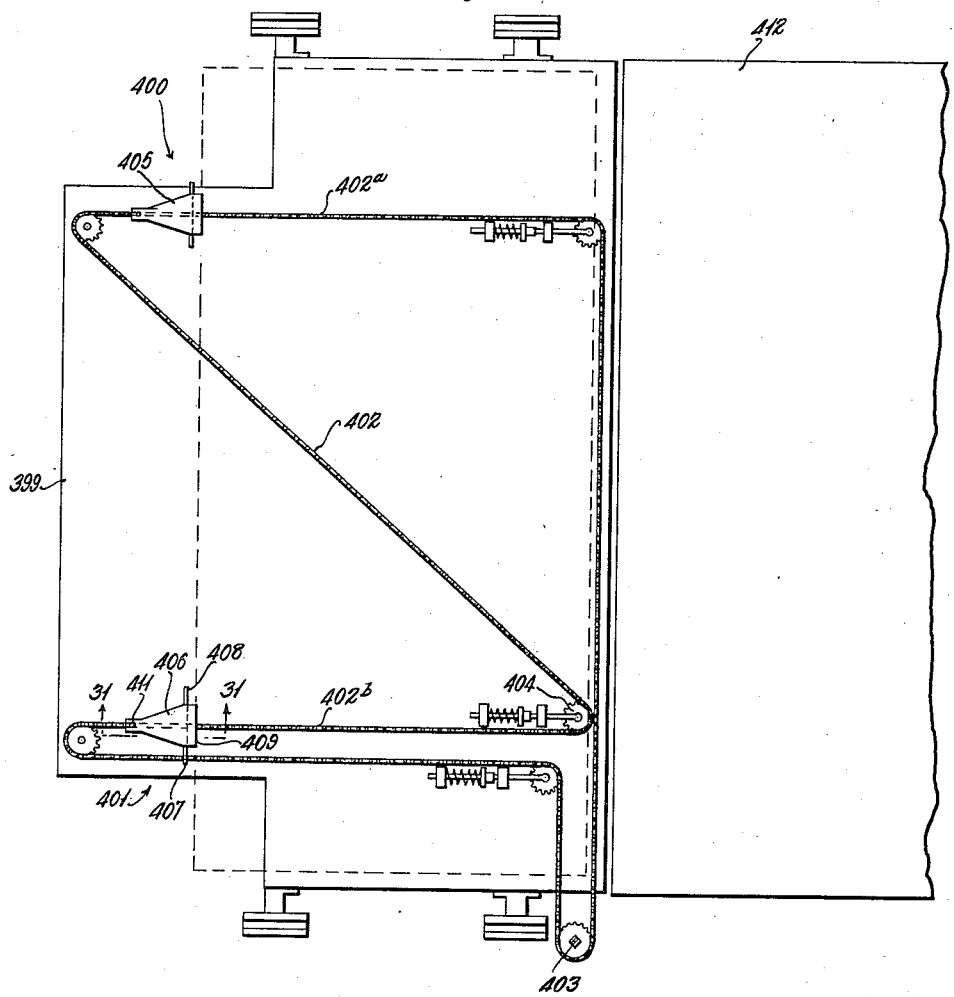
Figure 30 is a plan view of still another form of loader shelf.
Figure 31:
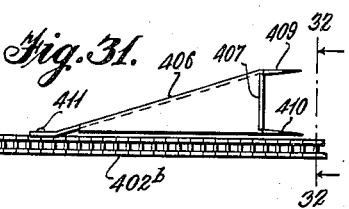
Figure 31 is a section on line 31—31 of Figure 30.
Figure 32:
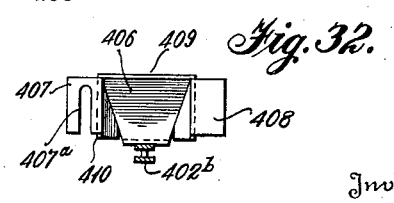
Figure 32 is a section on line 32—32 of Figure 31.

In Figure 30, reference numeral 399 designates a shelf of substantially the form shown in Figure 19 in that it is provided in its rear portion with corner recesses 400 and 401. Reference numeral 402 designates an endless chain arranged substantially as in Figure 19 so as to be driven from a square shaft 403. In this case, however, one or more of the sprockets, as at 404, is spring urged in order to tension the chain and also to provide a yieldable drive for the pushers of which two are shown and designated by the reference numerals 405 and 406. As shown in Figures 31 and 32 pusher 406 is constituted by an inverted channel open at the front, provided with side wings 407 and 408, and with thin top and bottom lips 409 and 410. The pusher 406 terminates rearwardly in a spring tail 411 secured to the run 402b of the chain, the pusher 405 which is similarly formed, being similarly secured to the run 402a. The spring tails normally hold the pushers in the relation shown in Figures 31 and 32 wherein they substantially fill the loader opening vertically. However, when an assembly is loaded in the opening, its weight will depress the pushers so that the assemblies can be properly spotted in the position indicated in dotted lines in Figure 30. As shown in Figure 32, the wing 407 is provided with a downwardly opening slot 407a for the purpose of clearing the adjacent run of chain 402.

When chain 402 is driven to advance the pushers, the lips 409 and 410 will engage over and under the rear margin of the assembly so as to confine the same and pushing action will be imparted by the front of the pushers including the side wings. It will be seen that the forward ends of the pushers can pass beyond the rear edge of the shelf so as to push the assembly completely within a press opening of which one of the defining plates is shown at 412. Should one side of the assembly stick in the loader opening, the drive to the adjacent pusher will yield somewhat due to the yieldable sprocket mounting but the other pusher will continue so that a shearing or twisting action will occur. This will ordinarily suffice to release the assembly. It may be noted that this shearing or twisting action will also occur under similar circumstances in the first embodiment.

Referring to Figure 33, a plurality of shelves 399 are shown at maximum daylight. Reference numeral 413 designates two assemblies being loaded into the top opening over a barrier 414 similar in function to that described in connection with Figure 16 hereinbefore. The pushers are depressed by the assemblies into straddling relation to their associated runs so as not to interfere with the loading operation. The plates 412 of the press are closed, completing a pair of panels in each press opening.

Each plate, except the topmost, has secured to its rear edge a shelf 415 which may be constituted by bars in parallel relation inclined slightly downwardly and rearwardly and carrying rollers as at 416 mounted on anti-friction bearings and with their top portions exposed. At its rear end each shelf 415 carries a plurality of latches as at 417 fixed on a common rock shaft 418 and normally yieldingly held in the position shown in Figure 33 by leaf springs as at 419.

In Figure 34, the assemblies 413 are shown in advance of the pushers, the latter having risen to the position shown due to their spring mountings. The loader shelves have been moved to minimum daylight for the purpose of consolidating the assemblies and the press plates are still in closed relation.

Figure 37:
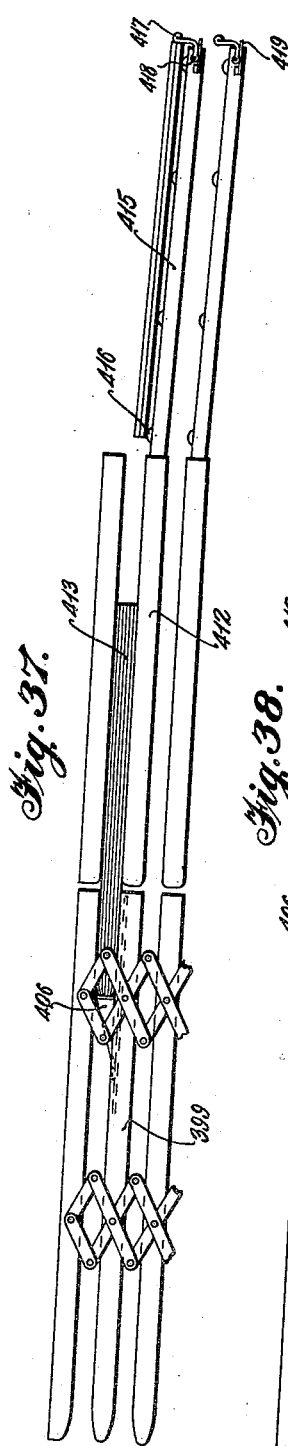
Figure 38:
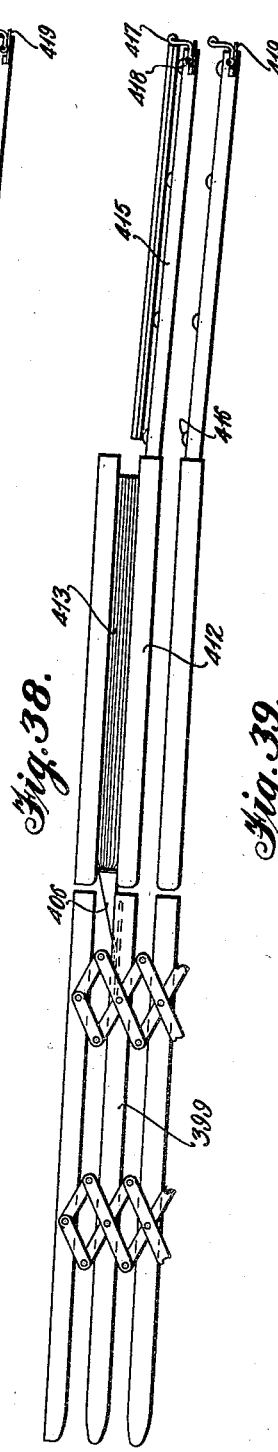

In Figure 35, the press has opened and the press openings, at maximum, have the same depth as the loader openings which are at minimum. The pushers may now be advanced as in Figure 36 so that the assemblies 413 will be pushed into the press opening into engagement with the completed panels so that the latter are pushed out at the rear of the press onto a shelf 415. The first rollers of each shelf are preferably located close to the edge of the press plates with their tops slightly above the level of the latter. With this arrangement as the panels are discharged from the opening, they finally overbalance on these first rollers as a fulcrum and leave the press opening by gravity, moving completely clear of the press plates and into engagement with the abutments or latches 417 as shown in Figures 37 and 38.

Figure 39:
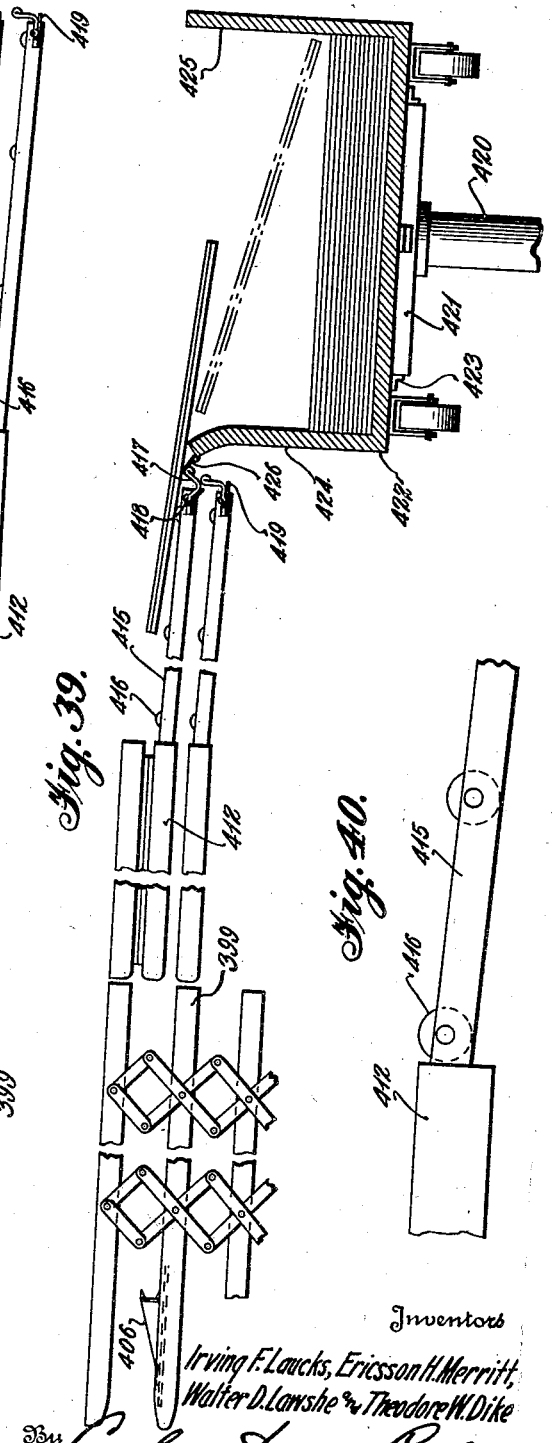
Figure 40:
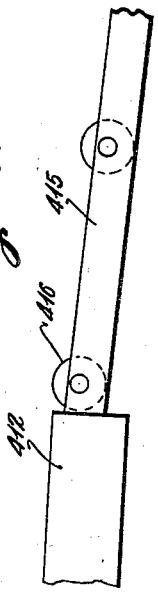
Figure 40 is an enlarged view in elevation of a portion of an unloading shelf and the adjacent portion of a press plate.

In Figure 39, the press has closed on the new charge of assemblies and the loader shelves are open in readiness for reloading. Reference numeral 420 designates the vertical plunger of a hydraulic ram having fixed on its upper end a square plate 421. Reference numeral 422 designates a truck which is adapted to be supported on plate 421 and accurately positioned on the four sides of the latter by blocks or lugs as at 423 secured to the flat bottom of the truck. The truck has a front wall 424 here shown as slightly curved at its upper edge toward the shelves, and has an upright rear wall 425. On its upper edge wall 424 carries a hinged trip 426 which as the truck is moved upwardly will strike the latches 417 but will break so as to be without effect. As the truck is moved downwardly, however, the trip 426 will strike the latches 417, withdrawing them from the panel edges and permitting the panels to gravitate into stacked relation in the truck, the shelves being thus successively unloaded as the truck moves downwardly.

It will thus be seen that according to the invention, outside of manual loading of the loader, the remaining sequences, terminating in a stack of completed panels, may be carried out automatically.

Figure 41:
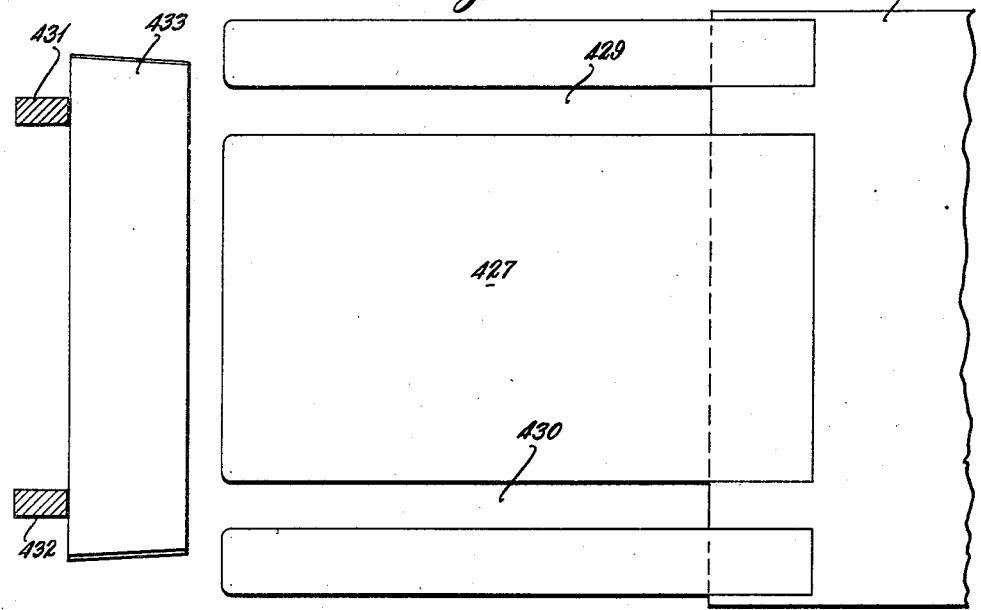
Figure 41 is a plan view of a further form of loader shelf, a press plate and pusher.
Figure 42:
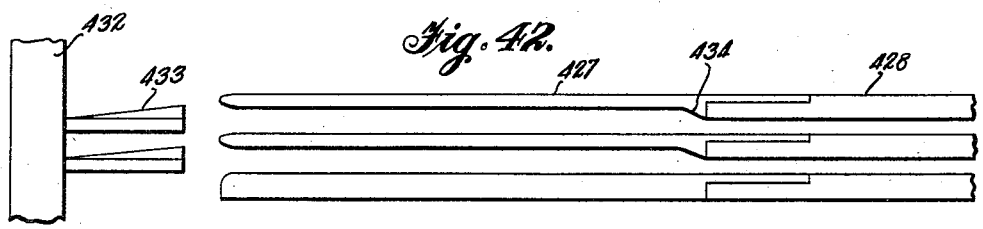
Figure 42 is a side elevation of a series of shelves, plates and pushers according to Figure 41.

In Figures 41 and 42, the loader shelves 427 are shown as being mounted directly on the press plates 428 and as having parallel slots 429 and 430. Reference numerals 431 and 432 designate uprights which carry pushers 433, these pushers being adapted to enter between the loader shelves and the uprights to travel along slots 429 and 430 so that assemblies on the shelves are simultaneously moved to position in the press. The pushers may be carried by a track-mounted car. As particularly shown in Figure 42, the loader openings are deeper than the press openings and are merged into the latter through the inclines 434 at the mouths of the openings. The pushers 433 are vertically collapsible and at maximum fill the loader openings vertically while yet being able to move into the press openings so as to properly spot the assemblies. It will be evident that as the assemblies are moved from the loader shelves, the inclines 434 will exert a compressive effect, assuring that the thus compacted incoming ends of the assemblies will positively engage the completed panels to eject the latter. The loader can be charged from the rear or from either side.

Figure 43:
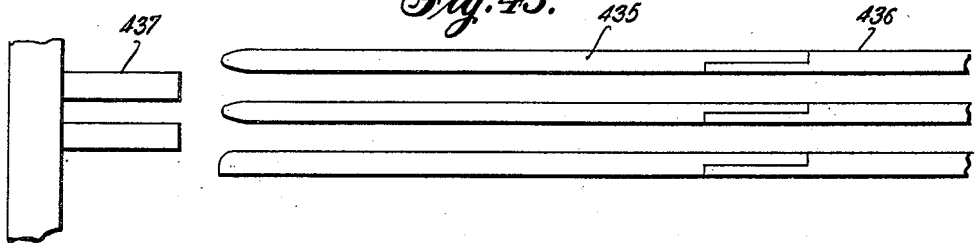
Figure 43 is a view similar to that of Figure 42 but showing a different form of loader shelf and pusher.

In Figure 43, the openings between the loader shelves 435 are of the same depth as the openings between the pressplates 436. The loader shelves are slotted as in Figure 41 to receive the uprights which carry the pushers 437 which in this case need not be collapsible but may be of a fixed thickness substantially equal to the height of the loader and pressing openings. In this case, the advantage of simultaneous loading of the press openings is secured as well as simultaneous ejection of the completed panels and while there will be no precompression if the assemblies are of a thickness to be freely loadable onto the loader shelves, the assemblies will be subjected to top and bottom confinement.

It will be evident from the above that our improved method includes steps novel in themselves, as well as in their full sequence, and that the steps may be carried out by means of varied form and arrangement. It will consequently be understood that we do not limit ourselves in these respects except as in the following claims.

We claim:

1. The method of discharging a pressed plied panel from a press which comprises confining an assembly of plies by top and bottom pressure and utilizing the confined assembly to propel the panel from the opened press.

2. The method of charging an assembly of plies into and discharging a pressed panel from a press, which comprises compressing and confining an assembly by top and bottom pressure to prevent the plies from spreading, opening the press to free a pressed panel therein and to an extent to provide an opening having a depth substantially the same as the thickness of the confined assembly so that the confined condition of the assembly is maintained, and sliding said assembly into the press opening and into engagement with the panel whereby to push the latter out of the press.

3. Apparatus of the class described comprising an abutment and a shelf beneath the abutment and movable vertically relative thereto, endless chains extending along the sides of said shelf, a pusher connected between said chains, a motor for driving said chains, means for rendering the motor operative to advance the pusher, means for automatically reversing the pusher drive to return the pusher, and means for automatically arresting the return drive.

4. Apparatus according to claim 3 wherein the means for controlling the movements of the pusher includes a pilot chain driven by the motor.

5. Apparatus of the class described comprising an abutment and a shelf beneath the abutment and movable vertically relative thereto, endless chains extending along the sides of said shelf, a pusher connected between said chains, a motor for driving said chains, means for rendering the motor operative to advance the pusher, means for automatically reversing the pusher drive to return the pusher, means for automatically arresting the return drive, and means automatically operated to interrupt the pusher drive when the pusher in its advance meets with resistance beyond the ordinary.

6. Apparatus of the class described comprising a group of superposed horizontal shelves, means for raising and lowering the group as a whole, means for moving the shelves together and apart to contract or expand the spaces therebetween, means for rendering the first means effective to raise the group with the spaces expanded, and means for automatically rendering the first means ineffective whereby to arrest the raising action and for rendering the second means effective whereby to contract the said spaces.

7. Apparatus according to claim 6 wherein means are provided for rendering said first means ineffective as each shelf reaches a predetermined elevation.

8. Apparatus of the class described comprising a group of superposed horizontal shelves, means for raising and lowering the group as a whole, means for moving the shelves together and apart to contract or expand the spaces therebetween, means for rendering the first means effective to lower the group with the spaces contracted, and means for automatically rendering the first means ineffective whereby to arrest the lowering action and for rendering the second means effective whereby to expand the said spaces.

9. The combination with a panel press having multiple openings defined by plates, of means for simultaneously pushing completed panels from the openings, and shelves carried by said plates to directly receive the discharged panels.

10. The combination with a panel press having multiple openings defined by plates, of means for simultaneously pushing completed panels from the openings, inclined shelves carried by said plates for directly receiving the discharged panels, and abutments for holding the panels on the shelves, said abutments being withdrawable to permit movement of the panels from the shelves.

11. The combination with a multiple opening panel press, of means for simultaneously pushing completed panels from the openings, inclined shelves for directly receiving the discharged panels, abutments for holding the panels on the shelves, a receiver movable successively past the shelves, and means for withdrawing said abutments to permit the panels to pass successively to said receiver.

12. The combination with a multiple opening panel press, of means for simultaneously pushing completed panels from the openings, inclined shelves for directly receiving the discharged panels, abutments for holding the panels on the shelves, a receiver movable successively past the shelves, and means on said receiver effective during movement of the receiver to cause withdrawal of said abutments whereby to permit the panels to pass successively to said receiver.

13. The combination with a press having an opening, of a closely adjacent roller shelf frame having a slight downward slope away from the press opening, said roller shelf being provided with rollers nearest to the press which project slightly above the level of the floor of the press opening to provide a roller fulcrum effective to carry the plywood out of the press by gravity as soon as said plywood is pushed far enough out of the opening to overbalance on said adjacent upward projecting rollers.

14. A roller shelf frame as set forth in claim 13 provided with an adjustable latch at the lower edge of said shelf capable of retaining a plywood panel upon the shelf frame against gravity when the latch is engaged and of permitting the plywood to roll off the shelf by gravity when the latch is released.

15. A loader comprising top and bottom members presenting adjacent surfaces defining an opening into which an assembly of plies may be loaded, pusher means operable between said surfaces and temporarily movable into a space provided in one of said members whereby to enable an assembly to be pushed past said means into position to be engaged by the latter.

16. Structure according to claim 15 wherein said pusher means comprises a pair of pushers and wherein an endless chain disposed in a plane parallel to said surfaces has parallel runs on which said pushers are mounted.

17. A loader comprising a shelf, a pair of drive members on said shelf reciprocable in parallel relation, and pusher means driven by said members, the drive of at least one of said members being yieldable.

18. The method of charging an assembly of plies into a press opening which comprises confining the assembly by top and bottom pressure to prevent spreading of the plies and pushing the thus confined assembly into the opening while maintaining the opening at a spread to maintain the confined condition of the entering assembly.

19. The method of charging an assembly of plies into a press opening and discharging a pressed panel from said opening, said opening having a maximum spread less than the thickness of the assembly, said method comprising partially consolidating the assembly by top and bottom pressure to reduce its thickness to the spread of the opening, and pushing the thus consolidated assembly into the opening and against the panel to eject the latter.

20. The method of charging an assembly of plies into a press opening and discharging a pressed panel from said opening, said opening having a maximum height less than the thickness of the assembly, said method comprising progressively partially consolidating the assembly to reduce its thickness to the height of the opening while pushing it into the opening and against the panel to eject the latter.

21. In the manufacture of plywood panels, the method which comprises charging a free assembly of plies into a press opening, closing said opening to an extent only sufficient to partially consolidate the assembly, maintaining the closed condition of the press while transferring the thus consolidated assembly by sliding into the directly adjacent opening of a second press, the opening of the second press having a spread to substantially maintain the partially consolidated condition of the assembly during delivery thereto, and then closing the opening of the second press to completely consolidate the assembly to form a panel.

22. Apparatus comprising a press including a pair of horizontal plates defining a maximum opening of less spread than an assembly of plies to be pressed, means for partially consolidating the assembly by top and bottom pressure to reduce its thickness to the spread of the opening, and means for pushing the thus consolidated assembly into said opening and thereby ejecting a previously pressed panel from the opening.

23. Apparatus comprising a press including a pair of horizontal plates defining a maximum opening of less height than an assembly of plies to be pressed, and means at the mouth of the opening effective to progressively partially consolidate and reduce the thickness of the assembly to the height of the opening as the assembly is pushed into the opening and against a previously pressed panel to eject the latter.

24. Apparatus comprising a loading unit having horizontal members defining multiple openings adapted to be charged with assemblies of plies from one side, means for discharging the assemblies from the same side of said unit, a press unit having multiple openings which are faced toward said side of the loading unit and are spaced apart as the openings of the latter, and means for moving said units together so that assemblies discharged from the loading unit are directly receivable in the openings of the press unit and for moving said units apart to render said side of the loading unit accessible for charging, said discharging means including pushers in the openings of the loading unit occupying rest positions wherein they serve as stops for the incoming assemblies.

25. Apparatus comprising a loading unit having horizontal members defining multiple openings adapted to be charged with assemblies of plies from one side, means for discharging the assemblies from the same side of said unit, a press unit having multiple openings which are faced toward said side of the loading unit and are spaced apart as the openings of the latter, means for moving said units together so that assemblies discharged from the loading unit are directly receivable in the openings of the press unit and for moving said units apart to render said side of the loading unit accessible for charging, a clearance beneath the loading unit when the latter is in the apart relation, and means for lowering the loading unit into said clearance and for lifting it therefrom past a loading station located between the apart units.

26. A press comprising means defining an opening adapted to receive an assembly of plies for pressing, and pusher means reciprocable in said opening for ejecting the pressed assembly, said pusher means having a starting position wherein it serves as a positioning stop for the assembly when the latter is loaded edgewise into the opening.

27. In apparatus of the class described, a unit comprising a group of superposed horizontal shelves, means for moving said shelves together and apart, a clearance beneath said unit, a loading station at one side of said unit adjacent said clearance, means for lowering said unit into said clearance and for lifting it therefrom past the loading station for the successive loading of the shelves while the latter are in their apart relation, a press on the opposite side of said loading station from said unit and having openings substantially aligned with the openings between said shelves when said unit is above said clearance and the loaded shelves are moved together, and means for moving said unit over said station into adjacency with said press whereby to facilitate transfer from the unit openings to the press openings.

28. The combination with a press having multiple openings defined by plates movable to pressing relation from substantially uniform maximum spaced relation, of a loader having multiple openings defined by shelves and adapted to freely receive free assemblies of plies, and means for moving said shelves together to close said receiving openings to substantially uniform predetermined minimum spacing whereby to partially consolidate the assemblies, the loader being so related to the press that when the loader openings are closed to the partially consolidating extent they are opposite the press openings when the latter are at their maximum so that the partially consolidated assemblies can be directly slid into the press openings from the loader openings, the said maximum being such that the partially consolidated condition of the incoming assemblies is maintained.

29. In apparatus of the class described, a frame, a group of superposed horizontal shelves carried by said frame for movement together and apart, means carried by said frame for moving said shelves together and apart, and means in connection with said frame for lifting and lowering the frame and therewith the shelves past a loading station for the successive loading of the shelves while in apart relation, the loaded shelves being then movable together to pressing relation.

IRVING F. LAUCKS.
ERICSSON H. MERRITT.
WALTER D. LAWSHE.
THEODORE W. DIKE.